(12) United States Patent
Porter et al.

(10) Patent No.: US 9,442,504 B2
(45) Date of Patent: Sep. 13, 2016

(54) METHODS AND APPARATUS FOR ADAPTIVE OPERATION OF SOLAR POWER SYSTEMS

(75) Inventors: Robert M. Porter, Wellington, CO (US); Anatoli Ledenev, Fort Collins, CO (US)

(73) Assignee: AMPT, LLC, Fort Collins, CO (US)

( * ) Notice: Subject to any disclaimer, the term of this patent is extended or adjusted under 35 U.S.C. 154(b) by 823 days.

(21) Appl. No.: 13/254,666

(22) PCT Filed: Apr. 17, 2009

(86) PCT No.: PCT/US2009/041044
§ 371 (c)(1),
(2), (4) Date: Sep. 2, 2011

(87) PCT Pub. No.: WO2010/120315
PCT Pub. Date: Oct. 21, 2010

(65) Prior Publication Data
US 2011/0316346 A1   Dec. 29, 2011

(51) Int. Cl.
*H02J 1/00* (2006.01)
*G05F 1/67* (2006.01)
*H02J 3/38* (2006.01)

(52) U.S. Cl.
CPC .............. *G05F 1/67* (2013.01); *H02J 3/383* (2013.01); *H02J 3/385* (2013.01); *Y02E 10/56* (2013.01); *Y02E 10/58* (2013.01); *Y10T 307/707* (2015.04)

(58) Field of Classification Search
CPC G05F 1/67; H02J 3/383–3/385; Y02E 10/56
USPC .......................................................... 307/82
See application file for complete search history.

(56) References Cited

U.S. PATENT DOCUMENTS

| 3,900,943 A | 8/1975 | Sirti et al. |
| 4,127,797 A | 11/1978 | Perper |

(Continued)

FOREIGN PATENT DOCUMENTS

| EP | 0677749 A3 | 1/1996 |
| EP | 0677749 A2 | 10/1996 |

(Continued)

OTHER PUBLICATIONS http://www.solarsentry.com; Protecting Your Solar Investment, 2005, Solar Sentry Corp.

(Continued)

*Primary Examiner* — Hal Kaplan
(74) *Attorney, Agent, or Firm* — Santangelo Law Offices, P.C.

(57) ABSTRACT

Methods and apparatus may provide for the adaptive operation of a solar power system (3). Solar energy sources (1) and photovoltaic DC-DC power converters (2) may be interconnected in serial, parallel, or combined arrangements. DC photovoltaic power conversion may be accomplished utilizing dynamically adjustable voltage output limits (8) of photovoltaic DC-DC power converters (2). A photovoltaic DC-DC power converter (2) may include at least one external state data interface (7) receptive to at least one external state parameter of a solar power system (3). A dynamically adjustable voltage output limit control (12) may be used to relationally set a dynamically adjustable voltage output limit (8) of a photovoltaic DC-DC power converter (2). Dynamically adjusting voltage output limits (8) may be done in relation to external state parameter information to achieve desired system results.

34 Claims, 8 Drawing Sheets

(56) References Cited

U.S. PATENT DOCUMENTS

| | | |
|---|---|---|
| 4,168,124 A | 9/1979 | Pizzi |
| 4,218,139 A | 8/1980 | Sheffield |
| 4,222,665 A | 9/1980 | Tachizawa et al. |
| 4,249,958 A | 2/1981 | Baudin et al. |
| 4,274,044 A | 6/1981 | Barre |
| 4,341,607 A | 7/1982 | Tison |
| 4,375,662 A | 3/1983 | Baker |
| 4,390,940 A | 6/1983 | Corbefin et al. |
| 4,395,675 A | 7/1983 | Toumani |
| 4,404,472 A | 9/1983 | Steigerwald |
| 4,409,537 A | 10/1983 | Harris |
| 4,445,030 A | 4/1984 | Carlton |
| 4,445,049 A | 4/1984 | Steigerwald |
| 4,513,167 A | 4/1985 | Brandstetter |
| 4,528,503 A | 7/1985 | Cole |
| 4,580,090 A | 4/1986 | Bailey et al. |
| 4,581,716 A | 4/1986 | Kamiya |
| 4,619,863 A | 10/1986 | Taylor |
| 4,626,983 A | 12/1986 | Harada et al. |
| 4,649,334 A | 3/1987 | Nakajima |
| 4,725,740 A | 2/1988 | Nakata |
| 4,749,982 A | 6/1988 | Rikuna et al. |
| 4,794,909 A | 1/1989 | Eiden |
| 4,873,480 A | 10/1989 | Lafferty |
| 4,896,034 A | 1/1990 | Kiriseko |
| 4,899,269 A | 2/1990 | Rouzies |
| 4,922,396 A | 5/1990 | Niggemeyer |
| 5,027,051 A | 6/1991 | Lafferty |
| 5,028,861 A | 7/1991 | Pace et al. |
| 5,144,222 A | 9/1992 | Herbert |
| 5,179,508 A | 1/1993 | Lange et al. |
| 5,270,636 A | 12/1993 | Lafferty |
| 5,401,561 A | 3/1995 | Fisun et al. |
| 5,402,060 A | 3/1995 | Erisman |
| 5,493,155 A | 2/1996 | Okamoto et al. |
| 5,493,204 A | 2/1996 | Caldwell |
| 5,503,260 A | 4/1996 | Riley |
| 5,646,502 A | 7/1997 | Johnson |
| 5,648,731 A | 7/1997 | Decker et al. |
| 5,659,465 A | 8/1997 | Flack et al. |
| 5,669,987 A | 9/1997 | Takehara et al. |
| 5,689,242 A | 11/1997 | Sims et al. |
| 5,741,370 A | 4/1998 | Hanoka |
| 5,747,967 A | 5/1998 | Muljadi et al. |
| 5,782,994 A | 7/1998 | Mori et al. |
| 5,801,519 A | 9/1998 | Midya et al. |
| 5,896,281 A | 4/1999 | Bingley |
| 5,898,585 A | 4/1999 | Sirichote et al. |
| 5,923,100 A | 7/1999 | Lukens et al. |
| 5,932,994 A | 8/1999 | Jo et al. |
| 6,046,401 A | 4/2000 | McCabe |
| 6,081,104 A | 6/2000 | Kern |
| 6,124,769 A | 9/2000 | Igarashi et al. |
| 6,162,986 A | 12/2000 | Shiotsuka |
| 6,180,868 B1 | 1/2001 | Yoshino et al. |
| 6,181,590 B1 | 1/2001 | Yamane et al. |
| 6,191,501 B1 | 2/2001 | Bos |
| 6,218,605 B1 | 4/2001 | Dally et al. |
| 6,218,820 B1 | 4/2001 | D'Arrigo et al. |
| 6,219,623 B1 | 4/2001 | Wills |
| 6,262,558 B1 | 7/2001 | Weinberg |
| 6,278,052 B1 | 8/2001 | Takehara et al. |
| 6,281,485 B1 | 8/2001 | Siri |
| 6,282,104 B1 | 8/2001 | Kern |
| 6,314,007 B2 | 11/2001 | Johnson, Jr. et al. |
| 6,331,670 B2 | 12/2001 | Takehara et al. |
| 6,351,400 B1 | 2/2002 | Lumsden |
| 6,369,462 B1 | 4/2002 | Siri |
| 6,433,522 B1 | 8/2002 | Siri |
| 6,433,992 B2 | 8/2002 | Nakagawa et al. |
| 6,441,896 B1 | 8/2002 | Field |
| 6,448,489 B2 | 9/2002 | Kimura et al. |
| 6,493,246 B2 | 12/2002 | Suzui et al. |
| 6,515,215 B1 | 2/2003 | Mimura |
| 6,545,211 B1 | 4/2003 | Mimura |
| 6,545,868 B1 | 4/2003 | Kledzik et al. |
| 6,593,521 B2 | 7/2003 | Kobayashi |
| 6,624,350 B2 | 9/2003 | Nixon et al. |
| 6,670,721 B2 | 12/2003 | Lof et al. |
| 6,686,533 B2 | 2/2004 | Baum et al. |
| 6,686,727 B2 | 2/2004 | Ledenev et al. |
| 6,703,555 B2 | 3/2004 | Takabayashi et al. |
| 6,750,391 B2 | 6/2004 | Bower et al. |
| 6,765,315 B2 * | 7/2004 | Hammerstrom et al. ...... 307/66 |
| 6,791,024 B2 | 9/2004 | Toyomura |
| 6,804,127 B2 | 10/2004 | Zhou |
| 6,889,122 B2 | 5/2005 | Perez |
| 6,914,418 B2 | 7/2005 | Sung |
| 6,920,055 B1 | 7/2005 | Zeng et al. |
| 6,952,355 B2 | 10/2005 | Riggio et al. |
| 6,958,922 B2 | 10/2005 | Kazem |
| 6,984,965 B2 | 1/2006 | Vinciarelli |
| 6,984,970 B2 | 1/2006 | Capel |
| 7,019,988 B2 | 3/2006 | Fung et al. |
| 7,046,531 B2 | 5/2006 | Zocchi et al. |
| 7,068,017 B2 | 6/2006 | Willner et al. |
| 7,072,194 B2 | 7/2006 | Nayar et al. |
| 7,091,707 B2 | 8/2006 | Cutler |
| 7,092,265 B2 | 8/2006 | Kernahan |
| 7,158,395 B2 | 1/2007 | Deng et al. |
| 7,193,872 B2 | 3/2007 | Siri |
| 7,227,278 B2 | 6/2007 | Realmuto et al. |
| 7,248,946 B2 | 7/2007 | Bashaw et al. |
| 7,274,975 B2 | 9/2007 | Miller |
| 7,333,916 B2 | 2/2008 | Warfield et al. |
| 7,339,287 B2 | 3/2008 | Jepsen et al. |
| 7,365,661 B2 | 4/2008 | Thomas |
| 7,471,073 B2 | 12/2008 | Rettenwort et al. |
| 7,479,774 B2 | 1/2009 | Wai et al. |
| 7,514,900 B2 | 4/2009 | Sander et al. |
| 7,596,008 B2 | 9/2009 | Iwata et al. |
| D602,432 S | 10/2009 | Moussa |
| 7,602,080 B1 | 10/2009 | Hadar et al. |
| 7,605,498 B2 | 10/2009 | Ledenev et al. |
| 7,619,200 B1 | 11/2009 | Seymour et al. |
| 7,619,323 B2 | 11/2009 | Tan et al. |
| 7,663,342 B2 | 2/2010 | Kimball et al. |
| 7,719,140 B2 | 5/2010 | Ledenev et al. |
| 7,768,155 B2 | 8/2010 | Fornage |
| 7,786,716 B2 | 8/2010 | Simburger et al. |
| 7,807,919 B2 | 10/2010 | Powell |
| 7,834,580 B2 | 11/2010 | Haines |
| 7,843,085 B2 | 11/2010 | Ledenev et al. |
| 7,919,953 B2 | 4/2011 | Porter et al. |
| 7,948,221 B2 | 5/2011 | Watanabe et al. |
| 7,962,249 B1 | 6/2011 | Zhang et al. |
| 8,004,116 B2 | 8/2011 | Ledenev et al. |
| 8,018,748 B2 | 9/2011 | Leonard |
| 8,093,756 B2 | 1/2012 | Porter et al. |
| 8,106,765 B1 | 1/2012 | Ackerson et al. |
| 8,242,634 B2 | 8/2012 | Schatz et al. |
| 8,273,979 B2 | 9/2012 | Weir |
| 8,304,932 B2 | 11/2012 | Ledenev et al. |
| 8,461,811 B2 | 6/2013 | Porter |
| 8,473,250 B2 | 6/2013 | Adest |
| 8,482,153 B2 | 7/2013 | Ledenev et al. |
| 9,042,145 B2 | 5/2015 | Schill |
| 2001/0007522 A1 | 7/2001 | Nakagawa et al. |
| 2001/0032664 A1 | 10/2001 | Takehara et al. |
| 2002/0038200 A1 | 3/2002 | Shimizu |
| 2002/0195136 A1 | 12/2002 | Takabayashi et al. |
| 2003/0062078 A1 | 4/2003 | Mimura |
| 2003/0075211 A1 | 4/2003 | Makita et al. |
| 2003/0117822 A1 | 6/2003 | Stamenic et al. |
| 2004/0095020 A1 | 5/2004 | Kernahan et al. |
| 2004/0100149 A1 | 5/2004 | Lai |
| 2004/0135560 A1 | 7/2004 | Kernahan et al. |
| 2004/0159102 A1 | 8/2004 | Toyomura et al. |
| 2004/0164557 A1 | 8/2004 | West |
| 2004/0207366 A1 | 10/2004 | Sung |
| 2004/0211456 A1 | 10/2004 | Brown et al. |
| 2005/0002214 A1 | 1/2005 | Deng et al. |
| 2005/0068012 A1 | 3/2005 | Cutler |
| 2005/0105224 A1 | 5/2005 | Nishi |

(56) References Cited

U.S. PATENT DOCUMENTS

| | | |
|---|---|---|
| 2005/0109386 A1 | 5/2005 | Marshall |
| 2005/0116475 A1 | 6/2005 | Hibi et al. |
| 2005/0121067 A1 | 6/2005 | Toyomura |
| 2005/0162018 A1 | 7/2005 | Realmuto et al. |
| 2005/0169018 A1 | 8/2005 | Hatai et al. |
| 2005/0254191 A1 | 11/2005 | Bashaw et al. |
| 2006/0017327 A1 | 1/2006 | Siri et al. |
| 2006/0103360 A9 | 5/2006 | Cutler |
| 2006/0162772 A1 | 7/2006 | Presher et al. |
| 2006/0171182 A1 | 8/2006 | Siri et al. |
| 2006/0174939 A1 | 8/2006 | Matan |
| 2007/0024257 A1 | 2/2007 | Boldo |
| 2007/0035975 A1 | 2/2007 | Dickerson et al. |
| 2007/0044837 A1 | 3/2007 | Simburger et al. |
| 2007/0069520 A1 | 3/2007 | Schetters |
| 2007/0111103 A1 | 5/2007 | Konishiike et al. |
| 2007/0119718 A1 | 5/2007 | Gibson et al. |
| 2007/0133241 A1 | 6/2007 | Mumtaz et al. |
| 2007/0159866 A1 | 7/2007 | Siri |
| 2007/0165347 A1 | 7/2007 | Wendt et al. |
| 2007/0171680 A1 | 7/2007 | Perreault et al. |
| 2007/0236187 A1 | 10/2007 | Wai et al. |
| 2008/0036440 A1 | 2/2008 | Garmer |
| 2008/0062724 A1 | 3/2008 | Feng et al. |
| 2008/0097655 A1 | 4/2008 | Hadar et al. |
| 2008/0101101 A1 | 5/2008 | Iwata et al. |
| 2008/0111517 A1 | 5/2008 | Pfeifer et al. |
| 2008/0123375 A1 | 5/2008 | Beardsley |
| 2008/0136367 A1 | 6/2008 | Adest et al. |
| 2008/0143188 A1 | 6/2008 | Adest et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0186004 A1 | 8/2008 | Williams |
| 2008/0236648 A1 | 10/2008 | Klein et al. |
| 2008/0238195 A1 | 10/2008 | Shaver et al. |
| 2008/0247201 A1 | 10/2008 | Perol |
| 2008/0257397 A1 | 10/2008 | Glaser et al. |
| 2009/0020151 A1 | 1/2009 | Fornage |
| 2009/0039852 A1 | 2/2009 | Fishelov et al. |
| 2009/0078300 A1 | 3/2009 | Ang et al. |
| 2009/0114263 A1 | 5/2009 | Powell et al. |
| 2009/0120485 A1 | 5/2009 | Kikinis |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146505 A1 | 6/2009 | Powell et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0206666 A1 | 8/2009 | Sella et al. |
| 2009/0207543 A1 | 8/2009 | Boniface et al. |
| 2009/0218887 A1 | 9/2009 | Ledenev et al. |
| 2009/0234692 A1 | 9/2009 | Powell et al. |
| 2009/0237042 A1 | 9/2009 | Glovinski |
| 2009/0273241 A1 | 11/2009 | Gazit et al. |
| 2009/0283128 A1 | 11/2009 | Zhang et al. |
| 2009/0283129 A1 | 11/2009 | Foss |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2010/0001587 A1 | 1/2010 | Casey et al. |
| 2010/0026097 A1 | 2/2010 | Avrutsky et al. |
| 2010/0027297 A1 | 2/2010 | Avrutsky et al. |
| 2010/0078057 A1 | 4/2010 | Karg et al. |
| 2010/0085670 A1 | 4/2010 | Palaniswami et al. |
| 2010/0117858 A1 | 5/2010 | Rozenboim |
| 2010/0118985 A1 | 5/2010 | Rozenboim |
| 2010/0127570 A1 | 5/2010 | Hadar et al. |
| 2010/0127571 A1 | 5/2010 | Hadar et al. |
| 2010/0132758 A1 | 6/2010 | Gilmore |
| 2010/0139732 A1 | 6/2010 | Hadar et al. |
| 2010/0139734 A1 | 6/2010 | Hadar et al. |
| 2010/0139743 A1 | 6/2010 | Hadar et al. |
| 2010/0195361 A1 | 8/2010 | Stem |
| 2010/0229915 A1 | 9/2010 | Ledenev |
| 2010/0246230 A1 | 9/2010 | Porter et al. |
| 2010/0253150 A1 | 10/2010 | Porter et al. |
| 2010/0308662 A1 | 12/2010 | Schatz et al. |
| 2010/0327659 A1 | 12/2010 | Lisi |
| 2011/0005567 A1 | 1/2011 | VanderSluis et al. |
| 2011/0210611 A1 | 9/2011 | Ledenev et al. |
| 2011/0316346 A1 | 12/2011 | Porter et al. |
| 2012/0032515 A1 | 2/2012 | Ledenev et al. |
| 2012/0043818 A1 | 2/2012 | Stratakos et al. |
| 2012/0104864 A1 | 5/2012 | Porter et al. |
| 2012/0175963 A1 | 7/2012 | Adest et al. |
| 2012/0223584 A1 | 9/2012 | Ledenev et al. |
| 2013/0271096 A1 | 10/2013 | Inagaki |
| 2014/0015325 A1 | 1/2014 | Ledenev et al. |
| 2015/0130284 A1 | 5/2015 | Ledenev et al. |

FOREIGN PATENT DOCUMENTS

| | | |
|---|---|---|
| EP | 0824273 A2 | 2/1998 |
| EP | 0964415 A1 | 12/1999 |
| EP | 0964457 A2 | 12/1999 |
| EP | 0964457 A3 | 12/1999 |
| EP | 00978884 A3 | 3/2000 |
| EP | 0780750 B1 | 3/2002 |
| EP | 1291997 | 3/2003 |
| EP | 1120895 A3 | 5/2004 |
| EP | 2515424 A2 | 4/2012 |
| GB | 310362 | 9/1929 |
| GB | 1231961 | 9/1969 |
| GB | 0424556.9 | 1/2006 |
| GB | 2415841 A | 1/2006 |
| GB | 2419968 A | 5/2006 |
| GB | 2421847 A | 7/2006 |
| GB | 2434490 A | 7/2007 |
| JP | 56042365 A2 | 4/1981 |
| JP | 60027964 A2 | 2/1985 |
| JP | 60148172 A2 | 8/1985 |
| JP | 62-256156 | 7/1987 |
| JP | 62154121 A2 | 9/1987 |
| JP | 05003678 A2 | 1/1993 |
| JP | 06035555 A2 | 2/1994 |
| JP | 06141261 A2 | 5/1994 |
| JP | 07026849 U2 | 1/1995 |
| JP | 07222436 A2 | 8/1995 |
| JP | 07-302130 | 11/1995 |
| JP | 08033347 A2 | 2/1996 |
| JP | 8046231 | 2/1996 |
| JP | 08066050 A2 | 3/1996 |
| JP | 08181343 A2 | 7/1996 |
| JP | 08204220 A2 | 8/1996 |
| JP | 09097918 A2 | 4/1997 |
| JP | 2000020150 A2 | 1/2000 |
| JP | 2000174307 | 6/2000 |
| JP | 2002231578 A2 | 8/2002 |
| JP | 2007104872 A | 4/2007 |
| JP | 2007225625 A | 6/2007 |
| JP | 27058845 A | 8/2007 |
| JP | 2007058843 A | 8/2007 |
| WO | 9003680 A1 | 4/1990 |
| WO | 02073785 A1 | 9/2002 |
| WO | 2004100344 A2 | 11/2004 |
| WO | 2004100348 A1 | 11/2004 |
| WO | 2004107543 A1 | 12/2004 |
| WO | 2005027300 A1 | 3/2005 |
| WO | 2005036725 A1 | 4/2005 |
| WO | 2005076445 A1 | 8/2005 |
| WO | 2006005125 A1 | 1/2006 |
| WO | 2006013600 A2 | 2/2006 |
| WO | 2006013600 A3 | 2/2006 |
| WO | 2006048688 A1 | 5/2006 |
| WO | 2006048689 A2 | 5/2006 |
| WO | 2006048689 A3 | 5/2006 |
| WO | 2006071436 A2 | 7/2006 |

(56) References Cited

FOREIGN PATENT DOCUMENTS

| | | | |
|---|---|---|---|
| WO | 2006078685 | A2 | 7/2006 |
| WO | 2006117551 | A2 | 11/2006 |
| WO | 2006137948 | A2 | 12/2006 |
| WO | 2007007360 | A2 | 1/2007 |
| WO | 2007008429 | A2 | 7/2007 |
| WO | 2007080429 | A2 | 7/2007 |
| WO | 2007142693 | A3 | 12/2007 |
| WO | 2008125915 | A2 | 10/2008 |
| WO | 2008125915 | A3 | 10/2008 |
| WO | 2008132551 | A3 | 11/2008 |
| WO | 2008132553 | A2 | 11/2008 |
| WO | 2008142480 | A2 | 11/2008 |
| WO | 2008142480 | A3 | 11/2008 |
| WO | 2008142480 | A4 | 11/2008 |
| WO | 2008069926 | A3 | 12/2008 |
| WO | 2009007782 | A2 | 1/2009 |
| WO | 2009007782 | A3 | 1/2009 |
| WO | 2009007782 | A4 | 1/2009 |
| WO | 2009003680 | A1 | 2/2009 |
| WO | 2009051853 | A1 | 4/2009 |
| WO | 2009051854 | A1 | 4/2009 |
| WO | 2009051870 | A1 | 4/2009 |
| WO | 2009055474 | A1 | 4/2009 |
| WO | 2009059028 | A2 | 5/2009 |
| WO | 2009059028 | A3 | 5/2009 |
| WO | 2009064683 | A2 | 5/2009 |
| WO | 2009064683 | A3 | 5/2009 |
| WO | 2009072075 | A2 | 6/2009 |
| WO | 2009072075 | A3 | 6/2009 |
| WO | 2009072075 | A9 | 6/2009 |
| WO | 2009072076 | A2 | 6/2009 |
| WO | 2009072076 | A3 | 6/2009 |
| WO | 2009072077 | A1 | 6/2009 |
| WO | 2009073867 | A1 | 6/2009 |
| WO | 2009073868 | A1 | 6/2009 |
| WO | 2009075985 | A2 | 6/2009 |
| WO | 2009075985 | A3 | 6/2009 |
| WO | 2009114341 | A2 | 9/2009 |
| WO | 2009114341 | A3 | 9/2009 |
| WO | 2009118682 | A2 | 10/2009 |
| WO | 2009118682 | A3 | 10/2009 |
| WO | 2009118682 | A4 | 10/2009 |
| WO | 2009118683 | A2 | 10/2009 |
| WO | 2009118683 | A3 | 10/2009 |
| WO | 2009118683 | A4 | 10/2009 |
| WO | 2009136358 | A1 | 11/2009 |
| WO | 2009136358 | A4 | 11/2009 |
| WO | 2009140536 | A2 | 11/2009 |
| WO | 2009140536 | A3 | 11/2009 |
| WO | 2009140539 | A2 | 11/2009 |
| WO | 2009140539 | A3 | 11/2009 |
| WO | 2009140543 | A2 | 11/2009 |
| WO | 2009140543 | A3 | 11/2009 |
| WO | 2009140551 | A2 | 11/2009 |
| WO | 2009140551 | A3 | 11/2009 |
| WO | 2010014116 | A1 | 2/2010 |
| WO | 2010062410 | A1 | 6/2010 |
| WO | 2010062662 | A2 | 6/2010 |
| WO | 2010062662 | A3 | 6/2010 |
| WO | 2010065043 | A1 | 6/2010 |
| WO | 2010002960 | A1 | 7/2010 |
| WO | 2010120315 | A1 | 10/2010 |
| WO | 2011049985 | A1 | 4/2011 |
| WO | 2012100263 | A2 | 7/2012 |

OTHER PUBLICATIONS

Solar Sentry Corp., Protecting Solar Investment "Solar Sentry's Competitive Advantage", 4 pages estimated as Oct. 2008.
Dallas Semiconductor; Battery I.D. chip from Dallas Semiconductor monitors and reports battery pack temperature, Bnet World Network, Jul. 10, 1995.
deHaan, S.W.H., et al; Test results of a 130W AC module, a modular solar AC power station, Photovoltaic Energy Conversion, 1994; Conference Record of the 24th IEEE Photovoltaic Specialists Conference Dec. 5-9, 1994; 1994 IEEE First World Conference, vol. 1, pp. 925-928.
Gomez, M; "Consulting in the solar power age," IEEE-CNSV: Consultants' Network of Silicon Valley, Nov. 13, 2007.
Guo, G.Z.; "Design of a 400W, 1 Omega, Buck-boost Inverter for PV Applications," 32nd Annual Canadian Solar Energy Conference, Jun. 10, 2007.
Wang, Ucilia; Greentechmedia; "National semi casts solarmagic;" www.greentechmedia.com; Jul. 2, 2008.
Kroposki, H. Thomas and Witt, B & C; "Progress in Photovoltaic Components and Systems," National Renewable Energy Laboratory, May 1, 2000; NREL-CP-520-27460.
Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; p. 2255, Aug. 6, 2002.
Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.
Kang, F et al; Photovoltaic Power Interface Circuit Incorporated with a Buck-boost Converter and a Full-bridge Inverter; doi:10.1016-j.apenergy.2004.10.009.
Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; pp. 622-625.
Lim, Y.H. et al; "Simple Maximum Power Point Tracker for Photovoltaic Arrays," Electronics Letters May 25, 2000; vol. 36, No. 11.
Linear Technology Specification Sheet, LTM4607, estimated as Nov. 14, 2007.
Matsuo, H et al; Novel Solar Cell Power Supply System using the Multiple-input DC-DC Converter; Telecommunications Energy Conference, 1998; INTELEC, 20th International, pp. 797-8022.
solar-electric.com; Northern Arizona Wind & Sun, All About MPPT Solar Charge Controllers; Nov. 5, 2007.
Oldenkamp, H. et al; AC Modules: Past, Present and Future, Workshop Installing the Solar Solution; pp. 22-23; Jan. 1998; Hatfield, UK.
U.S. Appl. No. 11/333,005, filed Jan. 17, 2006, First Named Inventor Gordon E. Presher, Jr.
Rodriguez, C; "Analytic Solution to the Photovoltaic Maximum Power Point Problem;" IEEE Transactions of Power Electronics, vol. 54, No. 9, Sep. 2007.
De Doncker, R. W.; "Power Converter for PV-Systems," Institute for Power Electrical Drives, RWTH Aachen Univ. Feb. 6, 2006.
Roman, E et al; "Intelligent PV Module for Grid-Connected PV Systems;" IEEE Transactions of Power Electronics, vol. 53, No. 4, Aug. 2006.
Russell, M.C. et al; "The Massachusetts Electric Solar Project: A Pilot Project to Commercialize Residential PC Systems," Photovoltaic Specialists Conference 2000; Conference Record of the 28th IEEE; pp. 1583-1586.
SatCon Power Systems, PowerGate Photovoltaic 50kW Power Converter System; Spec Sheet; Jun. 2004.
Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.
Shimizu, et al; "Generation Control Circuit for Photovoltaic Modules," IEEE Transactions on Power Electronics; vol. 16, No. 3, May 2001.
Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32.
Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003.
Cambridge Consultants, Interface Issue 43, Autumn 2007.

(56) References Cited

OTHER PUBLICATIONS

United States Provisional Application filed Oct. 15, 2007, U.S. Appl. No. 60/980,157.
United States Provisional Application filed Oct. 23, 2007, U.S. Appl. No. 60/982,053.
United States Provisional Application filed Nov. 15, 2007, U.S. Appl. No. 60/986,979.
United States Provisional Application filed Dec. 6, 2006, U.S. Appl. No. 60/868,851.
United States Provisional Application filed Dec. 6, 2006, U.S. Appl. No. 60/868,893.
United States Provisional Application filed Dec. 7, 2006, U.S. Appl. No. 60/868,962.
United States Provisional Application filed Mar. 26, 2007, U.S. Appl. No. 60/908,095.
United States Provisional Application filed May 9, 2007, U.S. Appl. No. 60/916,815.
Parallel U.S. Appl. No. 13/275,147; Final office action dated Aug. 24, 2012.
International Application No. PCT/US10/53253; International Preliminary Report on Patentabiity dated Jan. 25, 2012.
Parallel U.S. Appl. No. 12/682,559; Notice of allowance dated Apr. 17, 2012.
International Application No. PCT/US08/80794; International Preliminary Report on Patentabiity dated May 8, 2012.
Parallel U.S. Appl. No. 13/192,329; Final office action dated Jun. 13, 2012.
Parallel CN Patent Application No. 200880121101.7; office action dated Sep. 26, 2011.
Parallel CN Patent Application No. 200880121101.7; office action dated Jun. 11, 2012.
Parallel U.S. Appl. No. 13/192,329; Notice of Allowance dated Jul. 30, 2012.
International Application No. PCT/2012/022266, International Search Report dated Jul. 24, 2012.
International Application No. PCT/2012/022266, Written Opinion of the International Searching Authority dated Jul. 24, 2012.
Parallel U.S. Appl. No. 13/078,492; Final office action dated Nov. 8, 2012.
Parallel Chinese Patent Application No. 200880121009.0, Office Action dated Aug. 31, 2012.
Parallel U.S. Appl. No. 13/059,955; Final office action dated Sep. 27, 2012.
Parallel U.S. Appl. No. 13/059,955; Nonfinal office action dated Jan. 23, 2012.
Parallel SG Patent Application No. 201107477-0; written opinion dated Nov. 27, 2012.
Parallel U.S. Appl. No. 13/275,147; Nonfinal office action dated Dec. 29, 2011.
Parallel U.S. Appl. No. 12/682,559; Nonfinal office action dated Sep. 23, 2011.
Parallel U.S. Appl. No. 12/682,882; Notice of allowance dated Sep. 9, 2011.
European Patent Application No. 07 873 361.5 Office Communication dated Jul. 12, 2010 and applicant's response dated Nov. 22, 2010.
International Patent Application No. PCT/US2008/079605. International Preliminary Report on Patentability dated Jan. 21, 2011.
International Patent Application No. PCT/US2010/053253. International Search Report and International Written Opinion of the International Searching Authority.
Parallel International Application No. PCT/US09/41044; International Preliminary Report on Patentabiity dated Jul. 6, 2011.
U.S. Appl. No. 12/363,709; First Amended Accelerated Examination Support Document filed Jul. 15, 2009.
U.S. Appl. No. 12/363,709, Accelerated Examination Support Document filed Jan. 30, 2009.
Edelmoser, K. H. et al.; High Efficiency DC-to-AC Power Inverter with Special DC Interface; Professional Paper, ISSN 0005-1144, Automatika 46 (2005) 3-4, 143-148.

Esmaili, Gholamreza; Application of Advanced Power Electronics in Renewable Energy Sources and Hygrid Generating Systems, Ohio State University, Graduate Program in Electrical and Computer Engineering, 2006, Dissertation.
Jung, D; Soft Switching Boost Converter for Photovoltaic Power Generation System, 2008 13th International Power Electronics and Motion Control Conference (EPE-PEMC 2008).
Joo, Hyuk Lee; "Soft Switching Multi-Phase Boost Converter for Photovoltaic System," Power Electronics and Motion Control Conference, Sep. 1, 2008. EPE-PEMC 2008. 13th.
Kuo, J.-L.; "Duty-based Control of Maximum Power Point Regulation for Power Converter in Solar Fan System with Battery Storage," Proceedings of the Third IASTED Asian Conference, Apr. 2, 2007, Phuket, Thialand.
Enslin, J.H.R.; "Integrated Photovoltaic Maximum Power Point Tracking Converter;" Industrial Electronics, IEEE Transactions on vol. 44, Issue 6, Dec. 1997, pp. 769-773.
Dehbonei, Hooman; Corp author(s): Curtin University of Technology, School of Electrical and Computer Engineering; 2003; Description: xxi, 284 leaves; ill.; 31 cm. Dissertation: Thesis. Abstract.
Duncan, Joseph, A Global Maximum Power Point Tracking DC-DC Converter, Massachussetts Institute of Technology, Dept. of Electrical Engineering and Computer Science Dissertation; Jan. 20, 2005.
Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages).
Tse, K.K. et al. "A Novel Maximum Power Point Tracking Technique for PV Panels;" Dept. of Electronic Engineering, City University of Hong Kong; Source: PESC Record—IEEE Annual Power Electronics Specialists Conference, v 4, 2001, p. 1970-1975, Jun. 17-21, 2001; Abstract.
Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p. 97-103. Abstract.
Rajan, Anita; "Maximum Power Point Tracker Optimized for Solar Powered Cars;" Society of Automotive Engineers, Transactions, v 99, n Sect 6, 1990, p. 1408-1420; Abstract.
Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p. 2264-2271. Abstract.
Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565.
Esram, T., Chapman, P.L., "Comparison of Photovoltaic Array Maximum Power Point Tracking Techniques," Energy Conversion, IEEE Transactions, Vo. 22, No. 2, pp. 439-449, Jun. 2007.
Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p. 1785-1790. Abstract.
Anon Source; International Symposium on Signals, Circuits and Systems, Jul. 12-13, 2007; Iasi, Romania; Publisher: Institute of Electrical and Electroncis Engineers Computer Society; Abstract.
Case, M.J.; "Minimum Component Photovoltaic Array Maximum Power Point Tracker," Vector (Electrical Engineering), Jun. 1999; p. 4-8; Abstract.
Xue, John, "PV Module Series String Balancing Converters," Supervised by Geoffrey Walker, Nov. 6, 2002; University of Queensland, School of Information Technology and Electrical Engineering.

(56) References Cited

OTHER PUBLICATIONS

Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp. 228-234. Abstract.
Reimann, T; Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp. 978-984. Abstract.
Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; pp. 775-780; Abstract.
Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, pp. 1048-1057; Abstract.
Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, pp. 858-863; Abstract.
Duan, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article No. 4582577. Abstract.
Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp. 78-82 and 12-15. Abstract.
Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract.
Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331; Abstract.
Power Article, Aerospace Systems Lab, Washington University, St. Louis, MO; estimated at Sep. 2007.
International Application No. PCT/US08/60345, International Search Report dated Aug. 18, 2008.
International Application No. PCT/US08/60345, Written Opinion dated Aug. 18, 2008.
International Application No. PCT/US08/57105, International Search Report dated Jun. 25, 2008.
International Application No. PCT/US08/57105, Written Opinion dated Jun. 25, 2008.
International Application No. PCT/US08/70506, International Search Report dated Sep. 26, 2008.
International Application No. PCT/US08/70506, Written Opinion dated Sep. 26, 2008.
Chen, J., et al. Buck-Boost PWM Converters Having Two Independently Controlled Switches, IEEE Power Electronics Specialists Conference, Jun. 2001, vol. 2, pp. 736-741.
Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea.
Chen, J., et al. A New Low-Stress Buck-Boost Converter for Universal-Input PFC Applications, IEEE Applied Power Electronics Conference, Feb. 2001.
International Application No. PCT/US08/70506 corrected International Preliminary Report on Patentability, mailed Jun. 25, 2010.
SM3320 Power Optimizer Specifications; SolarMagic Power Optimizer Apr. 2009.
Feuermann, D. et al., Reversible low solar heat gain windows for energy savings. Solar Energy vol. 62, No. 3, pp. 169-175, 1998.
International Patent Application No. PCT/US08/60345. International Prelimianry Report on Patentability dated Aug. 30, 2010.
TwentyNinety.com/en/about-us/, printed Aug. 17, 2010; 3 pages.
National Semiconductor News Release—National semiconductor's SolarMagic Chipset Makes Solar Panels "Smarter" May 2009.
U.S. Appl. No. 12/340,540, filed Dec. 19, 2008, First Named Inventor Mordechay Avrutski.
U.S. Appl. No. 12/357,357, filed Jan. 21, 2009, First Named Inventor Earl G. Powell.
U.S. Appl. No. 12/392,042, filed Feb. 24, 2009, First Named Inventor Ron Hadar.
U.S. Appl. No. 12/467,117, filed May 15, 2009, First Named Inventor Leonid Rozenboim.
U.S. Appl. No. 12/542,632, filed Aug. 17, 2009, First Named Inventor Ron Hadar.
U.S. Appl. No. 12/567,169, filed Sep. 25, 2009, First Named Inventor Ron Hadar.
U.S. Appl. No. 12/628,977, filed Dec. 1, 2009, First Named Inventor Ron Hadar.
U.S. Appl. No. 12/628,997, filed Dec. 1, 2009, First Named Inventor Ron Hadar.
U.S. Appl. No. 12/202,110, filed Aug. 29, 2008, First Named Inventor Mordechay Avrutski.
U.S. Appl. No. 12/467,116, filed May 15, 2009, First Named Inventor Leonid Rozenboim.
U.S. Appl. No. 12/506,929, filed Jul. 21, 2009, First Named Inventor Ron Hadar.
U.S. Appl. No. 11/950,224, filed Dec. 4, 2007, First Named Inventor Meir Adest.
U.S. Appl. No. 11/950,271, filed Dec. 4, 2007, First Named Inventor Meir Adest.
U.S. Appl. No. 11/950,307, filed Dec. 4, 2007, First Named Inventor Meir Adest.
U.S. Appl. No. 11/951,419, filed Dec. 4, 2007, First Named Inventor Meir Adest.
U.S. Appl. No. 11/951,485, filed Dec. 6, 2007, First Named Inventor Meir Adest.
U.S. Appl. No. 11/951,562, filed Dec. 6, 2007, First Named Inventor Meir Adest.
U.S. Appl. No. 12/314,113, filed Dec. 4, 2008, First Named Inventor Meir Adest.
U.S. Appl. No. 12/314,115, filed Dec. 4, 2008, First Named Inventor Meir Adest.
U.S. Appl. No. 12/328,742, filed Dec. 4, 2008, First Named Inventor Meir Adest.
U.S. Appl. No. 12/329,520, filed Dec. 5, 2008, First Named Inventor Meir Adest.
U.S. Appl. No. 12/411,294, filed Mar. 25, 2009, First Named Inventor Guy Sella.
U.S. Appl. No. 12/435,549, filed May 5, 2009, First Named Inventor Meir Gazit.
U.S. Appl. No. 12/409,763, filed Mar. 24, 2009, First Named Inventor Tzachi Glovinsky.
U.S. Appl. No. 12/409,604, filed Mar. 24, 2009, First Named Inventor Tzachi Glovinsky.
U.S. Appl. No. 12/329,525, filed Dec. 5, 2008, First Named Inventor Meir Adest.
U.S. Appl. No. 12/314,114, filed Dec. 4, 2008, First Named Inventor Meir Gzait.
U.S. Appl. No. 12/187,335, filed Aug. 6, 2008, First Named Inventor Amir Fishelov.
U.S. Appl. No. 12/338,610, filed Dec. 18, 2008, First Named Inventor James Allen.
U.S. Appl. No. 12/495,840, filed Jul. 1, 2009, First Named Inventor Leo Francis Casey.
U.S. Appl. No. 12/738,068, filed Apr. 14, 2010, First Named Inventor Robert M. Porter.
U.S. Appl. No. 12/682,882, filed Apr. 13, 2010, First Named Inventor Robert M. Porter.
U.S. Appl. No. 12/682,559, filed Apr. 9, 2010, First Named Inventor Douglas S. Schatz.
Linares, L., et al., Improved Energy Capture in Series String Photovoltaics via Smart Distributed Power Electronics; Proceedings

(56) References Cited

OTHER PUBLICATIONS

APEC 2009: 24th Annual IEEE Applied Power Electronics Conference, Washington, D.C., Feb. 2009.
Knaupp, W. et al., Operation of a 10 kW PV facade with 100 W AC photovoltaic modules, 25th PVSC; May 13-17, 1996; Washington D.C.
Schoen, T.J.N., BIPV overview & getting PV into the marketplace in the Netherlands, The 2nd World Solar Electric Buildings Conference: Sydney Mar. 8-10, 2000.
Stern M., et al., Development of a Low-Cost Integrated 20-kW-AC Solar Tracking Subarray for Gid-Connected PV Power System Applications—Final Report, National Renewable Energy Laboratory, Jun. 1998.
Verhoeve, C.W.G., et al., Recent Test Results of AC-Module inverters, Netherlands Energy Research Foundation ECN, 1997.
International Application No. PCT/US08/57105, International Preliminary Report on Patentability, mailed Mar. 12, 2010.
International Application No. PCT/US09/41044, Search Report dated Jun. 5, 2009.
International Application No. PCT/US09/41044, Written Opinion dated Jun. 5, 2009.
International Application No. PCT/US08/79605, Search Report dated Feb. 3, 20009.
International Application No. PCT/US08/79605, Written Opinion dated Feb. 3, 20009.
International Application No. PCT/US08/80794, Search Report dated Feb. 23, 2009.
International Application No. PCT/US08/80794, Written Opinion dated Feb. 23, 2009.
Walker, G.R. et al; "Cascaded DC-DC Converter Connection of Photovoltaic Modules," IEEE Transactions of Power Electronics, vol. 19, No. 4, Jul. 2004.
Bower, et al. "Innovative PV Micro-Inverter Topology Eliminates Electrolytic Capacitors for Longer Lifetime," 1-4244-0016-3-06 IEEE p. 2038 (2006).
Parallel U.S. Appl. No. 13/079,492; Nonfinal office action dated May 16, 2012.
Great Britain Patent No. GB6125859, published Nov. 18, 1948 to Standard Telephones and Cables Limited. Specification and figures only. 3 pages.
Japanese Patent Application No. 07329954; publication No. 09148613A, published Jun. 6, 1997 to Sanyo Electric Co. Ltd. Abstract only, 1 page.
Japanese Patent Application No. 2000240897; publication No. 2001086765A, published Mar. 30, 2001 to Powerware Corp. Abstract Only, 1 page.
Parallel JP Patent Application No. 2010-529991; office action dated Dec. 14, 2012, 7 pages.
Parallel JP Patent Application No. 2010-529986; office action dated Mar. 5, 2013, 3 pages.
Related CN Patent Application No. 200880121101.7; Notice of Allowance dated Feb. 17, 2013, 3 pages.
Related Chinese Patent Application No. 200880121009.0, Office Action dated May 31, 2013, 7 pages.
Parallel JP Patent Application No. 2010-529991; office action dated Sep. 5, 2013, 6 pages.
Korean Patent Abstract for KR1020070036528, filed Apr. 13, 2007, Published Oct. 16, 2008, Publication No. 1020080092747, First Named Inventor: Hur, Jung Youn.

* cited by examiner

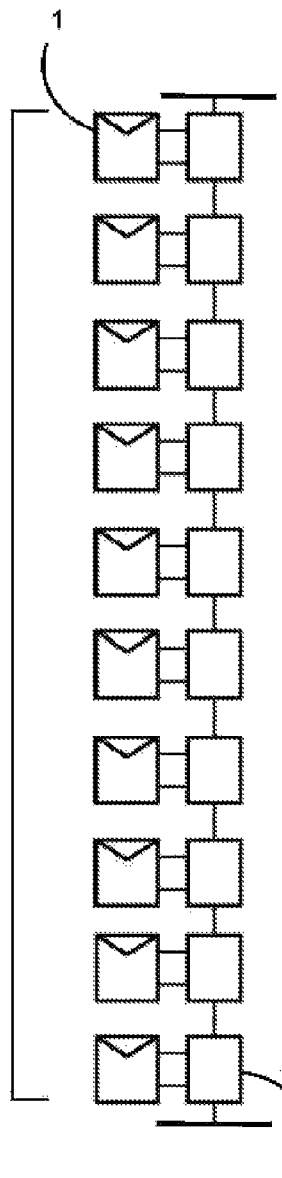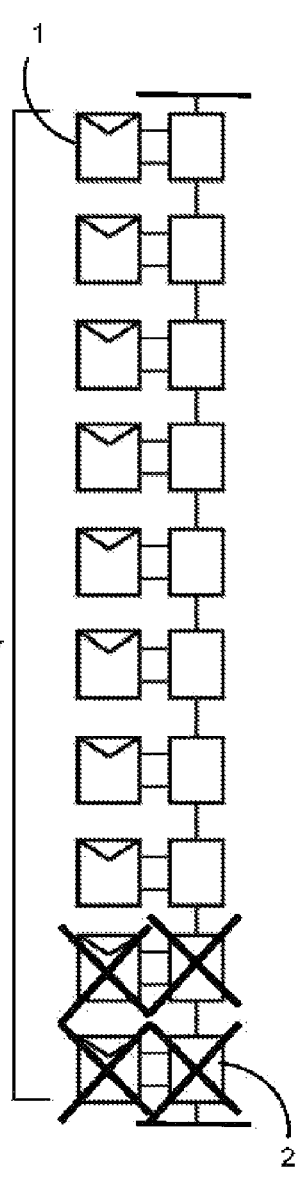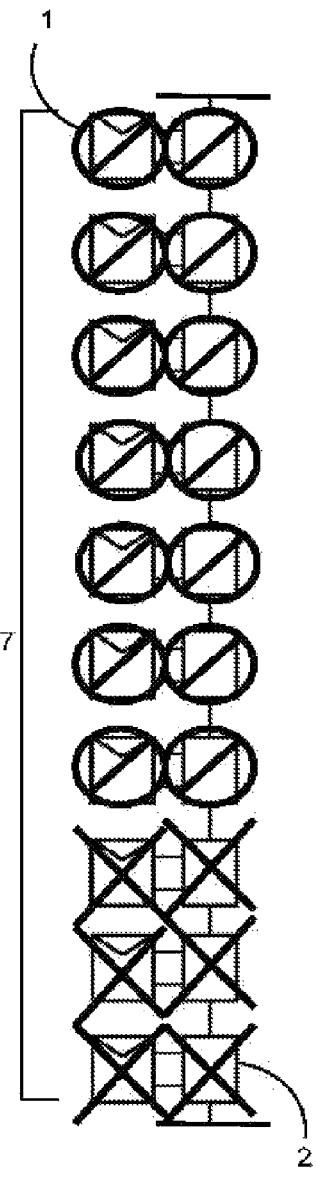
Fig. 7A
Prior Art
Fig. 7B
Prior Art
Fig. 7C
Prior Art

METHODS AND APPARATUS FOR ADAPTIVE OPERATION OF SOLAR POWER SYSTEMS

CROSS REFERENCE TO RELATED APPLICATIONS

This application is the United States National Stage of International Application No. PCT/US2009/041044, filed Apr. 17, 2009, said patent application and any priority case hereby incorporated herein by reference in its entirety.

TECHNICAL FIELD

Generally, the inventive technology relates to adaptively operating a solar power system. More particularly, the inventive technology may involve dynamically adjusting voltage output limits within the system to achieve desired operating voltages. The inventive technology may be particularly suited to adapting system operation to changing conditions or unforeseen events.

BACKGROUND

While solar power is a promising source of renewable energy, significant challenges remain with respect to exploiting this technology. One such challenge may involve a susceptibility of solar power systems to be influenced by a wide range of operating conditions. This susceptibility in part may stem from the architecture by which solar power systems typically are designed. In particular, solar power systems generally may utilize a distributed architecture, wherein a relatively large number of individual solar sources—such as solar panels—are used to generate power from sunlight. While ultimately the output of these individual solar sources may be combined to produce the overall power put out by the system, nevertheless each individual solar source may operate within its own set of conditions apart from the other solar sources in the system.

Several factors may influence the conditions within which individual solar sources operate. These conditions may include temperature, insolation, the photoelectric characteristics of the solar source itself, and the like. Moreover, individual solar sources frequently are operated with the goal of obtaining the maximum possible power output from the source. Techniques for operating an individual solar source in this manner generally may be referred to as maximum power point tracking (MPPT), and may be described in some embodiments for example in U.S. patent application Ser. No. 12/363,709, Filed Jan. 30, 2009, entitled "Systems for Highly Efficient Solar Power Conversion"; International Patent Application No. PCT/US08/80794, filed Oct. 22, 2008, entitled "High Reliability Power Systems and Solar Power Converters"; International Patent Application No. PCT/US08/79605, filed Oct. 10, 2008, entitled "Novel Solar Power Circuits and Powering Methods"; International Patent Application No. PCT/US08/70506, filed Jul. 18, 2008, entitled "High Efficiency Remotely Controllable Solar Energy System"; International Patent Application No. PCT/US08/60345, filed Apr. 15, 2008, entitled "AC Power Systems for Renewable Electrical Energy"; and International Patent Application No. PCT/US08/57105, filed Mar. 14, 2008, entitled "Systems for Highly Efficient Solar Power"; each hereby incorporated by reference herein in its entirety. As a result of these factors, each solar source in a solar power system may operate within a set of conditions perhaps unique and different from the other solar sources in the system.

Because a typical solar power system may have a large number of individual solar sources, each operating essentially within its own conditional framework, the task of combining the voltage outputs of these various solar sources to achieve a consistent and efficient operating voltage of the solar power system may pose technical challenges. For example, the solar sources in a solar power system often may be interconnected in various serial and parallel structures, such as wherein a number of individual solar panels may be serially connected to form a string, and wherein a number of strings may be connected in parallel to form an array. Naturally, the electrical properties of such serial and parallel connections may affect how the voltage output of individual solar sources is combined with the operating voltage of the overall system.

At one extreme, for example, underperforming solar sources on an individual string may cause a voltage drop in the string as a whole, since the total voltage in the string merely is the sum of the voltages of the individual solar sources on the string due to the serial nature of their interconnection. If the voltage in the string drops below a certain level, this may cause a loss of power for the array of strings connected in parallel, due to their parallel interconnection.

At another extreme, spikes in the output of individual solar sources in a string may cause a voltage gain for the string as whole, which again may result in inefficiencies due to the connection topology. Such spikes in voltage may be undesirable for efficiency, safety, or regulatory reasons. For example, solar power systems often are subject to regulatory requirements that impose a maximum operating voltage for the system—frequently a limit of 600 volts—and spikes in the voltage output of individual solar sources can cause the total voltage in the system to exceed the regulatory limit.

To deal with technical issues of this nature, conventional solar power systems may utilize techniques to limit the voltage output of solar sources. For example, where a solar source is known to put out a certain voltage under normal conditions, limits may be designed to create an operating range encompassing both the source's expected normal output as well as a degree of variance to accommodate changes in operating conditions. One architecture for setting such limits may involve connecting each solar source to a photovoltaic DC-DC power converter, wherein the converter may have hardware or software that sets voltage output limits within which the solar source is permitted to operate, and wherein the converters may be serially connected to form a string. The voltage output limits may provide a voltage output range within which the solar source may operate that can accommodate a degree of changed conditions. Should the voltage output limits be exceeded, the solar source may be shut down, disengaged, or otherwise controlled within the solar power system.

However, conventional voltage output limits for solar sources may entail significant drawbacks. For example, conventional voltage output limits only may be capable of being statically set. Once set, the voltage output limits may not be able to be adjusted in real time with respect to changing conditions affecting the solar power system. As a result, setting conventional voltage output limits in this manner may have resulted in undesirable trade-offs. For example, one trade-off may be to foreclose circumstances where it may be desirable to put out voltage for an individual solar source beyond the limit set for its output, such as perhaps to offset unusual voltage drops elsewhere in the system.

The foregoing problems related to conventional solar power systems may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY DISCLOSURE OF THE INVENTION

The inventive technology relates to methods and apparatus for adaptive operation of solar power systems and in embodiments may include the following the features: techniques for providing one or more external state parameters to a photovoltaic DC-DC power converter; techniques for relationally setting a dynamically adjustable voltage output limit for a photovoltaic DC-DC power converter in relation to one or more external state parameters; and techniques for utilizing a dynamically adjustable voltage output limit of a photovoltaic DC-DC power converter to convert DC photovoltaic input. Accordingly, the objects of the methods and apparatus for adaptive operation of solar power systems described herein address each of the foregoing in a practical manner. Naturally, further objects of the inventive technology will become apparent from the description and drawings below.

BRIEF DESCRIPTION OF THE DRAWINGS

FIGS. 7a, 7b, and 7c are schematic representations of conventional string response incorporating static limits to changing operating conditions for a given string in one embodiment.

MODES FOR CARRYING OUT THE INVENTION

As mentioned earlier, the present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
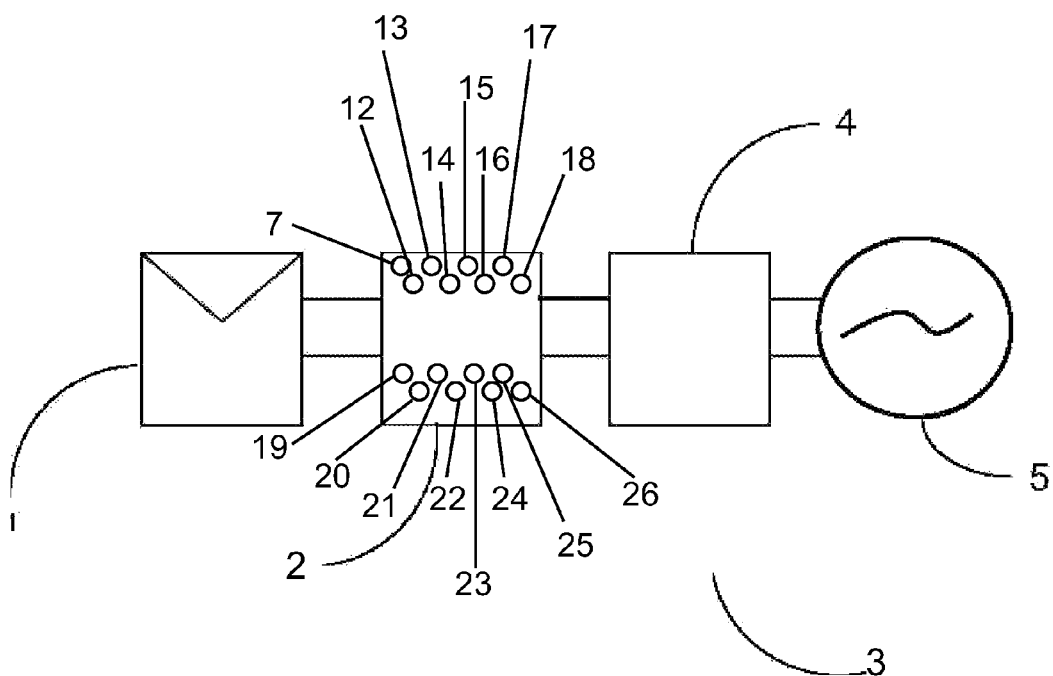
FIG. 1 is a schematic representation of a single solar source of a solar power system in one embodiment.

Now with reference primarily to FIG. 1, various embodiments may involve a method of solar energy power conversion. An example of a solar power energy conversion apparatus may be shown for one embodiment of the inventive technology in FIG. 1. A solar energy source (1) may have and be used to create a DC photovoltaic output, as by utilizing appropriate photoelectric effect principles. Any suitable solar energy source (1) may be utilized, such as a solar cell, a plurality of electrically connected solar cells, a plurality of adjacent electrically connected solar cells, a solar panel, a plurality of electrically connected solar panels, a string (27) of electrically connected solar panels, and the like.

Figure 3:
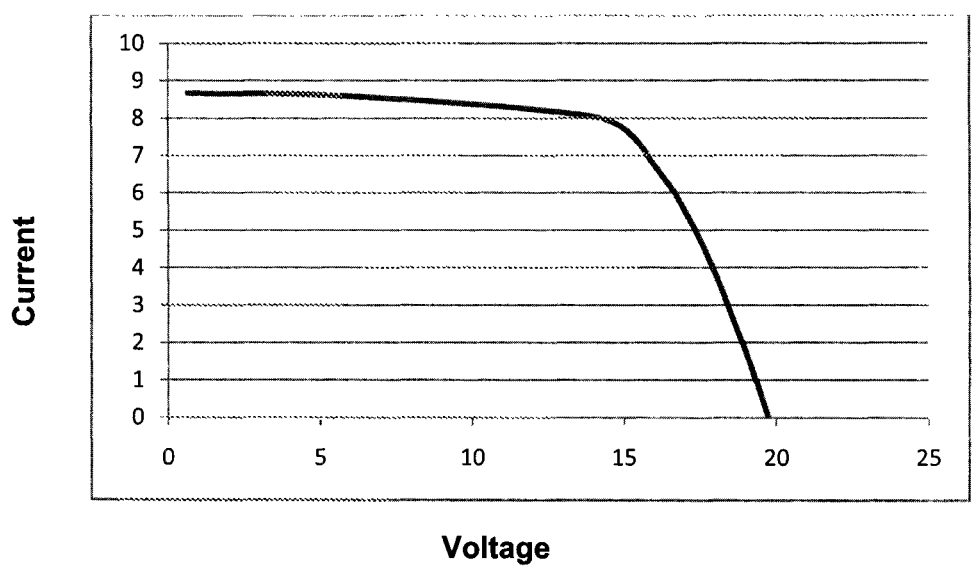
FIG. 3 is a plot of a relationship for current and voltage for a given solar source in one embodiment.
Figure 4:
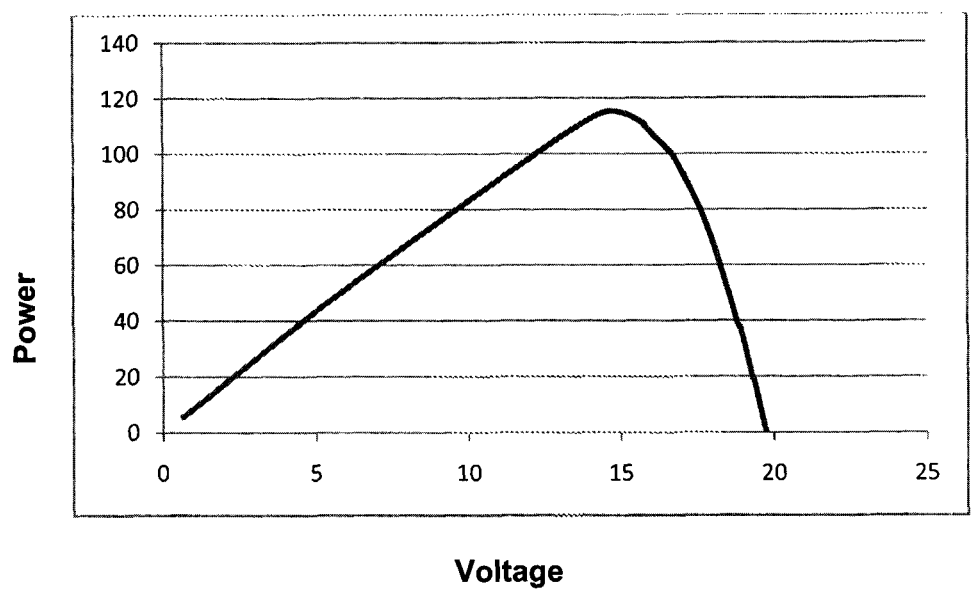
FIG. 4 is a plot of a relationship for power and voltage for a given solar source in one embodiment.
Figure 5A:
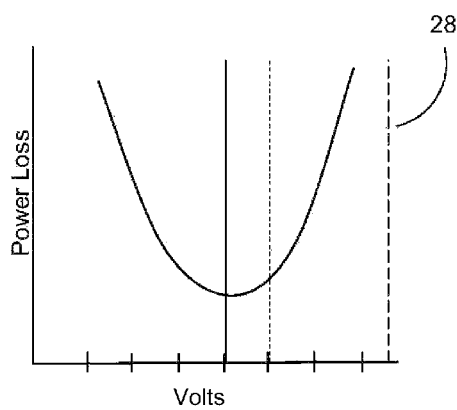
FIGS. 5a-5d are plots of conventional power converter response incorporating static limits to changing operating conditions for a given power converter in one embodiment.
Figure 5B:
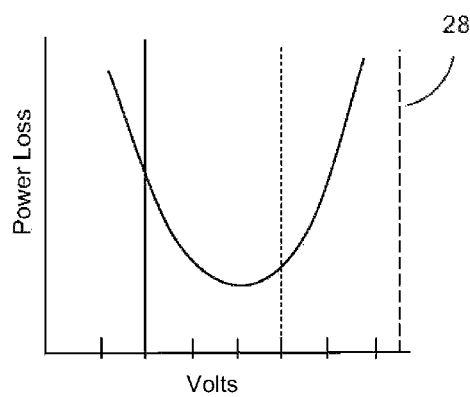
Figure 5C:
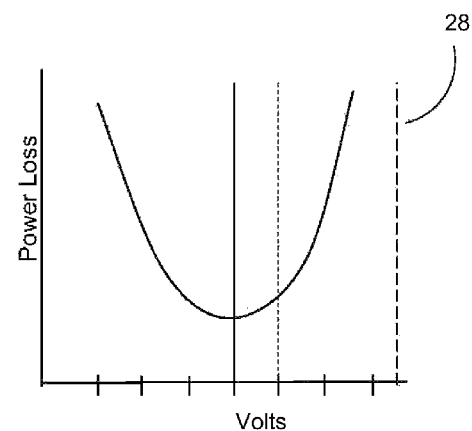
Figure 5D:
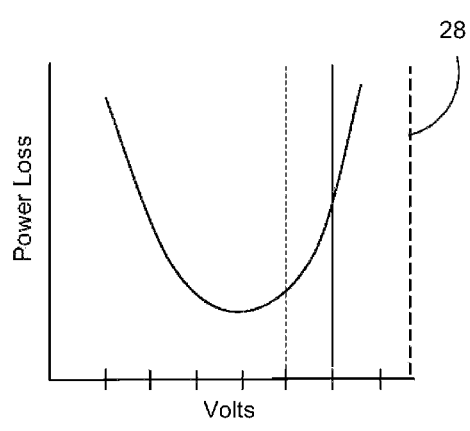

A DC photovoltaic output of a solar energy source (1) in various embodiments may be established as a DC photovoltaic input to a photovoltaic DC-DC power converter (2). The photovoltaic DC-DC power converter (2) may serve to accept power from the DC photovoltaic output and intermediate power transfer between the solar energy source (1) on one side and the solar power system (3) on the other side by converting the DC photovoltaic input in a manner that accommodates the requirements of each. As but one example, the photovoltaic DC-DC power converter (2) may permit a solar energy source (1) to be operated at an MPP value, such as by creating a MPP voltage for the solar energy source. To illustrate this, FIG. 3 provides a plot for a hypothetical solar energy source (1) illustrating that a property of solar energy sources (1) is a relationship between current and voltage when the source is in operation. Since power equals voltage times current, it follows that FIG. 4 represents the power produced by this hypothetical solar energy source (1) over a range of voltages. FIG. 4 dictates that maximum power is produced in the solar energy source (1) when the source is operated at the voltage corresponding to the peak of the curve. A photovoltaic DC-DC power converter (2) may allow the solar energy source (1) to operate at just such a voltage, for example perhaps by using maximum photovoltaic power point converter functionality control circuitry (13) to which a solar energy source (1) may be responsive. These MPP aspects may be more fully discussed for example in U.S. patent application Ser. No. 12/363,709, Filed Jan. 30, 2009, entitled "Systems for Highly Efficient Solar Power Conversion"; International Patent Application No. PCT/US08/80794, filed Oct. 22, 2008, entitled "High Reliability Power Systems and Solar Power Converters"; International Patent Application No.

PCT/US08/79605, filed Oct. 10, 2008, entitled "Novel Solar Power Circuits and Powering Methods"; International Patent Application No. PCT/US08/70506, filed Jul. 18, 2008, entitled "High Efficiency Remotely Controllable Solar Energy System"; International Patent Application No. PCT/US08/60345, filed Apr. 15, 2008, entitled "AC Power Systems for Renewable Electrical Energy"; and International Patent Application No. PCT/US08/57105, filed Mar. 14, 2008, entitled "Systems for Highly Efficient Solar Power"; each hereby incorporated by reference herein in its entirety. Other examples of how a photovoltaic DC-DC power converter (2) may serve to intermediate power transfer between a solar energy source (1) and a solar power system (3) may be discussed elsewhere herein, including for example converting a DC photovoltaic input with a photovoltaic DC-DC power converter (2) utilizing a dynamically adjustable voltage output limit (8).

With further attention primarily to FIG. 1, a converted DC photovoltaic output of a photovoltaic DC-DC power converter (2) may be established as converted DC photovoltaic input into a DC-AC inverter (4). While not necessary for all embodiments of the inventive technology, the DC-AC inverter (4) if included may serve to accomplish the step of inverting this converted DC photovoltaic input into an inverted AC photovoltaic output, such as a power output that can be used by, for example, a power grid (5). The step of inverting an input should be understood as encompassing and creation of any substantially alternating signal from any substantially unidirectional current flow signal even if that signal is not itself perfectly, or even substantially, steady. A DC-AC inverter (4) of any suitable design consistent with the principles discussed herein may be utilized.

Figure 2:
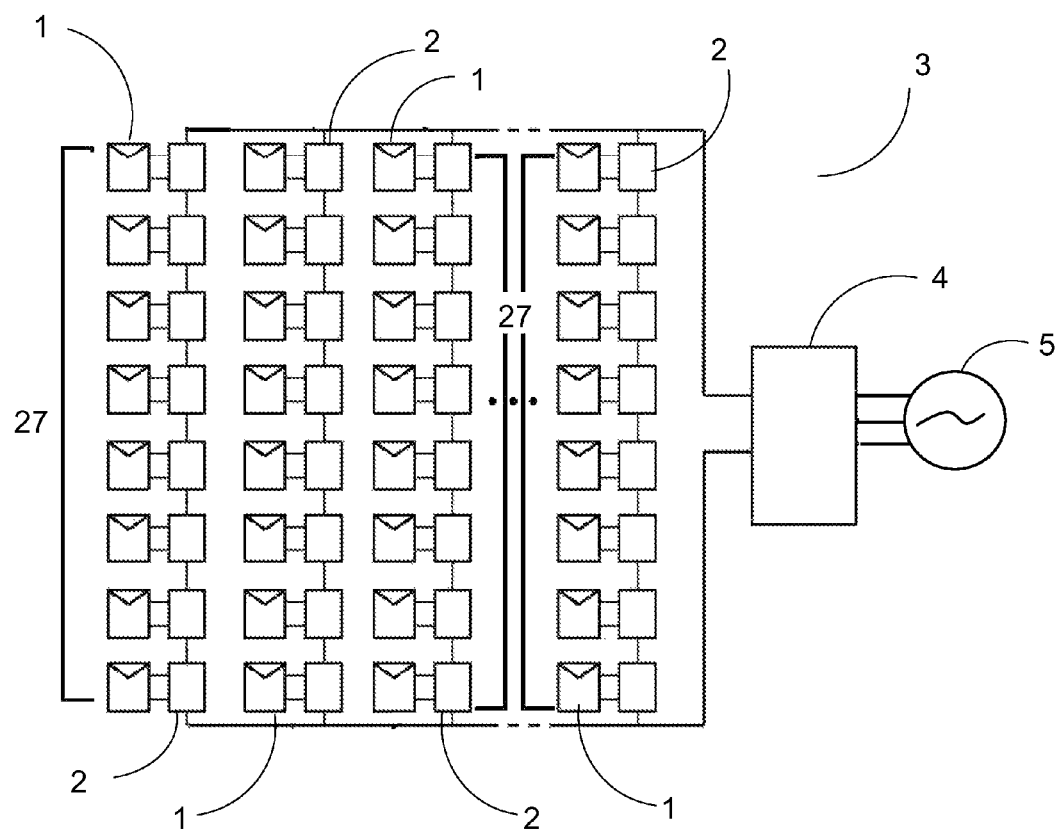
FIG. 2 is a schematic representation of multiple solar sources interconnected in serial and parallel arrangements in a solar power system in one embodiment.

Now referring primarily to FIG. 2, individual solar energy sources (1) may be combined to create a plurality of electrically interconnected sources. Such combinations in various embodiments may be responsive through either series or parallel connections. For example, a serially interconnected plurality of sources may form a string (27), perhaps such as a string (27) of solar panels. An example of parallel interconnection may include connecting strings (27) themselves in parallel, perhaps such as to form an array. Regardless of how a plurality of individual solar energy sources (1) are combined, by either physical or electrical layout, certain sources may be adjacent in that they may be exposed to somewhat similar electrical, mechanical, environmental, or insolative conditions. Naturally, output may be combined for serial interconnections so that their voltages may add whereas their currents may be identical. Conversely, currents may be additive for parallel interconnection whereas voltage may stay constant. Moreover, interconnection may be made in any suitable manner. For example, direct connection is but one manner in which the various elements may be responsive to each other, that is, some effect in one may directly or indirectly cause an effect or change in another.

As shown in FIG. 1, a photovoltaic DC-DC power converter (2) in various embodiments may include an external state data interface (7). The interface may enable the converter to send and receive data regarding operational states of a solar power system (3) external to the converter. Any suitable hardware, software, or the like consistent with the principles discussed herein may be utilized for an external state data interface (7). For example, in some embodiments an external state data interface (7) may send and receive information to and from a central source and enable power converter operation responsive to that central source, such as described for example in International Patent Application No. PCT/US08/70506, filed Jul. 18, 2008, entitled "High Efficiency Remotely Controllable Solar Energy System", hereby incorporated by reference herein in its entirety. Embodiments also may include an external state data interface (7) configured to send and receive information directly from individual elements within a solar power system (3), such as directly to and from other solar energy sources (1), directly to and from other photovoltaic DC-DC power converters (2), directly to and from other strings (27), or the like. Naturally, system state information may be derived from a variety of conditions. For example, an external state data interface (7) in various embodiments may include a voltage data interface (responsive, for example, to a voltage condition in the system), a current data interface (responsive, for example, to a current condition in the system), a power data interface (responsive, for example, to a power condition in the system), an insolation data interface (responsive, for example, to an insolation condition in the system), a temperature data interface (responsive, for example, to a temperature condition of the system), a system status data interface (responsive, for example, to an operating status of the system), a demand data interface (responsive, for example, to a demand placed on the system), a power converter output data interface (responsive, for example, to the output of one or more other power converters in the system), a string output data interface (responsive, for example, to the output of one or more other strings (27) in the system), a historical data tracking data interface (responsive, for example, to data tracked for an operational history of the system), a regulatory requirement data interface (responsive, for example, to operation of the system within regulatory requirements), or the like.

Moreover, an external state data interface (7) may serve to provide at least one external state parameter to a photovoltaic DC-DC power converter (2), wherein the parameter, of course, may correspond to the information received by the data interface. For example, an external state parameter may be a voltage parameter, a current parameter, a power parameter, an insolation parameter, a temperature parameter, a system status parameter, a demand status parameter, a power converter output parameter, a string output parameter, a historical data tracking parameter, a regulatory requirement parameter, or the like. In various embodiments, an external state data interface and an external state parameter may be multi-parametric, perhaps using two or more parametric components to provide information on an external state of the system. Regardless, an external state parameter may represent data about conditions in a solar power system (3) external to the power converter, which data then may be utilized in the operation of the power converter as may be necessary or desirable.

Such utilization, for example, may involve relationally setting a dynamically adjustable voltage output limit (8) of a photovoltaic DC-DC power converter (2). A voltage output limit (8) may establish a limit on the range of voltages which the converter may be allowed to put out. FIGS. 6a-6d provide one example of voltage output limits (8) specifying maximum voltages which a converter might be limited to. Of course, these examples are merely illustrative and not intended to be limiting.

By being dynamically adjustable, voltage output limits (8) may be capable of being adjusted as a dynamic part of the operation of a solar power system (3), as by way of real-time adjustment, near-real time adjustment, adjustment in equilibrium with other system elements, adjustment to cause an operational effect in the system or in response to an effect caused elsewhere in the system, and so forth. For example, FIGS. 6a and 6c may show one example in which dynamically adjustable voltage output limits (8) may be maximum voltages which the converter may be allowed to put out, but wherein the value of the maximum may be changed to the values shown in FIGS. 6b and 6d while the system is in operation, perhaps even as an operational component thereof. FIGS. 6a-6d also may show a dynamically adjustable range (11) for a photovoltaic DC-DC power converter (2). Of course, these examples are merely illustrative and are not intended to be limiting.

Relationally setting a dynamically adjustable voltage output limit (8) may involve setting the limit in relation to the value of one or more criteria, for example in relation to at least one external state parameter. For example, relationally setting a maximum voltage which the converter may put out may involve determining an appropriate maximum value for the voltage in relation to other voltage events in the system. FIGS. 6a-6d provide another example, wherein a dynamically adjustable voltage output limit (8) may be set in relation to a regulatory requirement or regulatory limit (28), creating a dynamically adjustable range (11). Of course, these examples are merely illustrative and not intended to be limiting. Any suitable parameter of the system could be utilized as the basis of relation upon which to relationally set a dynamically adjustable voltage output limit (8).

In various embodiments, a photovoltaic DC-DC power converter (2) may include a dynamically adjustable voltage output limit control (12) to relationally set a dynamically adjustable voltage output limit (8). The control may be relationally responsive to an external state data interface (7), as for example by receiving information from the data interface, operating in response to data interface information, or the like. Any suitable hardware, software, or combination thereof may be used for the control consistent with the principles discussed herein.

Figure 6A:
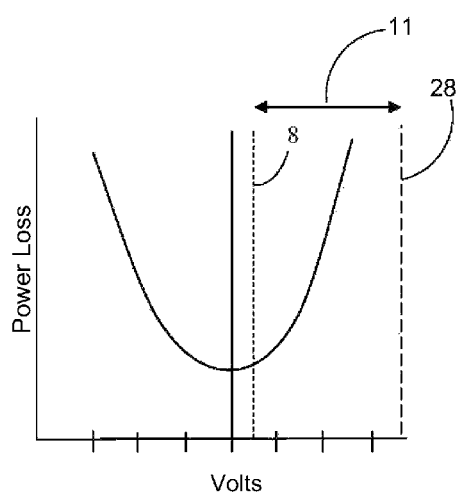
FIGS. 6a-6d are plots of power converter response utilizing dynamically adjustable voltage output limits in response to changing operating conditions for a given power converter in one embodiment.
Figure 6B:
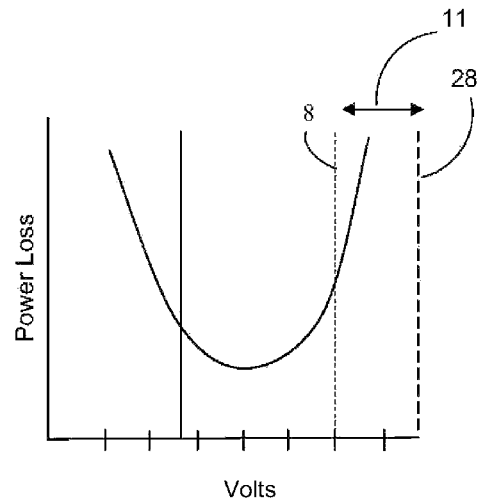
Figure 6C:
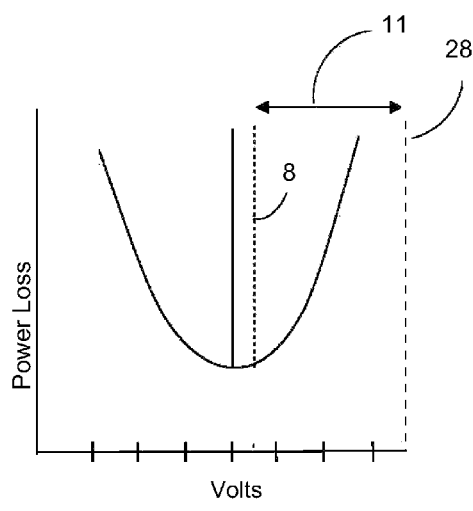
Figure 6D:
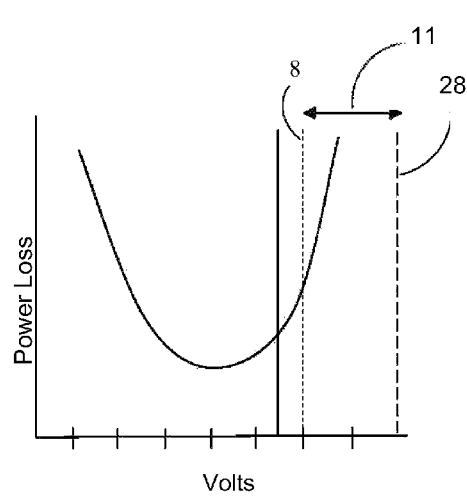

Moreover, various embodiments naturally may involve dynamically adjusting a dynamically adjustable voltage output limit (8) responsive to an external state parameter. FIGS. 6a-6d, for example, show an exemplary case in which maximum voltage output limits (8) for a converter have been raised to permit the converter to operate over a wider voltage range, and FIGS. 6a and 6b illustrate a dynamically adjustable range (11) for voltage output values. A dynamic adjustment made in this manner of course may be responsive to an external state parameter, for example wherein the external state parameter describes changed conditions in a solar power system (3) making it desirable that a particular converter in question have an expanded or restricted voltage range within which to operate.

Relationally setting and dynamically adjusting voltage output limits (8) may be done for a variety of purposes. One example may involve compensating for an external state parameter. The external state parameter may provide information about a change in the state of a solar power system (3), and it may be desirable to compensate for the changed condition by operating one or more photovoltaic DC-DC power converters (2) under adjusted voltage output limits (8). An exemplary case of such a situation may involve dropouts of solar energy sources (1) on a string. FIGS. 7 and 8 set forth two hypothetical strings (27) experiencing the dropout of multiple solar energy sources (1). For the hypothetical case, presume each source is to put out 40 volts under normal operating conditions. Because each string (27) has 10 sources, each string (27) will produce 400 volts under normal conditions. Further presume the system must operate under a regulatory limit of 600 volts.

FIGS. 7a, 7b, and 7c present a hypothetical conventional string (27), wherein each converter has static limits set at 50 volts, thereby safeguarding against the possibility of a spike in all 10 converters on the string (27) by ensuring the string (27) can produce only 500 volts at maximum, well below the 600 volt regulatory limit. Under normal operating conditions in FIG. 7a, each source will put out 40 volts and the string (27) will produce 400 volts. Under the unusual circumstance of FIG. 7b, where two sources have dropped out, the remaining eight sources may be able to put out 50 volts each, perhaps compensating for the dropouts of the two panels and ensuring the string (27) still produces 400 volts. Under the more dire situation of FIG. 7c, where three sources have dropped out, the string (27) no longer can produce 400 volts, because each of the 7 remaining converters would have to put out more than 50 volts, which is above the limit that has been statically set. Consequently, the entire string (27) must drop out in the hypothetical case of FIG. 7c.

Figure 8A:
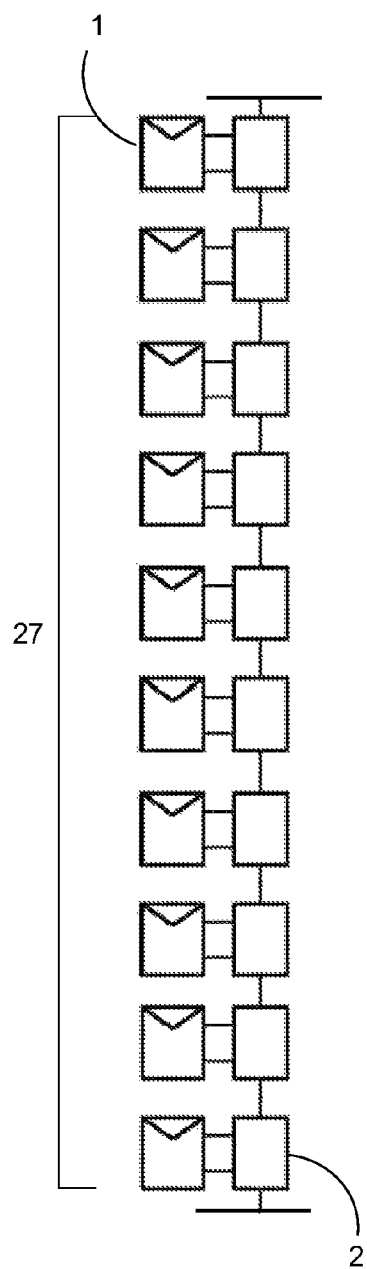
FIGS. 8a, 8b, and 8c are schematic representations of string response utilizing dynamically adjustable voltage output limits in response to changing operating conditions for a given string in one embodiment.
Figure 8B:
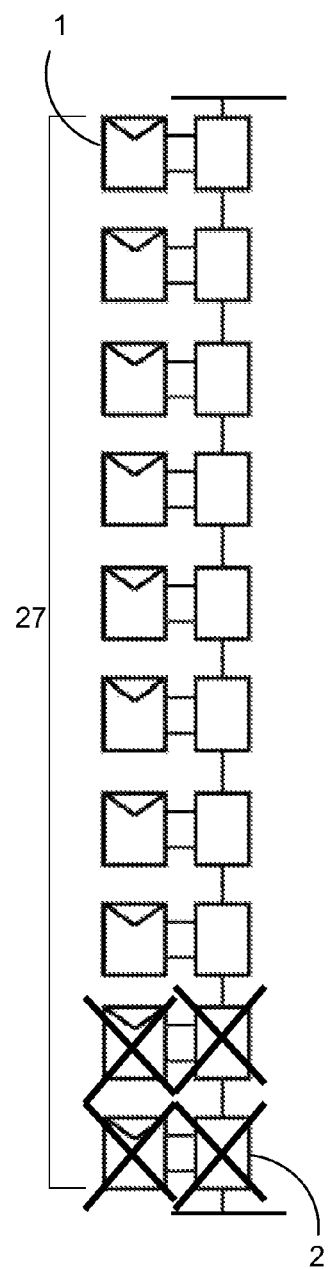
Figure 8C:
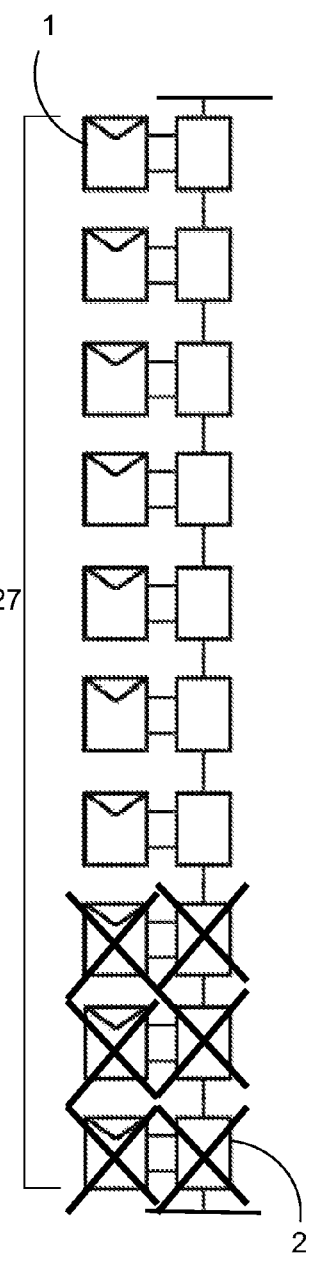

By way of comparison, FIG. 8 presents the hypothetical case wherein each power converter has a dynamically adjustable voltage output limit (8). In the normal case of FIG. 8a and the unusual case of FIG. 8b, the results are the same as for the conventional string (27) of FIG. 7. In the dire case of FIG. 8c, however, the string (27) may be kept in operation at 400 volts. This is because the voltage output limits (8) of the remaining seven converters can be dynamically adjusted above 50 volts. More specifically, the voltage output limits (8) of one converter, all converters, or some fraction in between can be adjusted to ensure the string (27) is kept in operation at the desired 400 volts. Naturally, each converter on the string may have an external state data interface (7) by which the converter is able to receive and act on information regarding the changing voltage conditions in the string (27). For example, voltage output data for individual converters may be provided to a central source in communication with the converters, and the central source may return information enabling individual converters to dynamically adjust their voltage output limits (8) accordingly. In this scenario, each of the seven remaining power converters may receive information from the central source through an external state data interface (7), such that voltage output limits (8) may be raised in a coordinated fashion to compensate for the three dropped out sources. Moreover, prior to raising voltage output limits (8) on the seven remaining converters, it may be desirable to lower the voltage output limits (8) on the three sources which have dropped out. This may serve to guard against voltage spikes in the event the three dropped out sources suddenly come back online (for example where the condition causing the dropout may suddenly abate, such as where insolation levels may suddenly rebound from a shaded state, a blockage may be suddenly removed, an intermittent malfunction may suddenly resolve itself, or the like). Having a lowered voltage output limit (8) already in place for the three dropped out sources may safeguard against an over-voltage risk, such as perhaps overloading an electrical component or exceeding a regulatory voltage requirement, that otherwise might occur should the three dropped out sources suddenly come back online and cause a string voltage which could exceed a regulatory limit. Another change which may occur is the inverter may stop taking power from a solar array. In this case all DC/DC converters may move to their maximum voltage limit. If low producing modules have low voltage limits and high producing modules have high limits it is still possible to always stay below regulatory limits.

FIGS. 7 and 8 exemplify one manner in which dynamically adjusting a voltage output limit (8) may compensate for an external state parameter. In various embodiments, an external state parameter compensation control (20), such as of a photovoltaic DC-DC power converter (2), may be utilized to effect such compensation. For example, compensating perhaps may involve raising a voltage output limit (8) of a photovoltaic DC-DC power converter (2), such as with a voltage output limit increase control (21), in response to a voltage drop of the external state parameter, such as detected perhaps by an external state parameter voltage drop detector (22). Conversely, compensating perhaps may involve lowering a voltage output limit of a photovoltaic DC-DC power converter (2), such as with a voltage output limit decrease control (23), in response to a voltage gain of an external state parameter, such as detected perhaps by an external state parameter voltage gain detector (24). Of course, the foregoing examples are intended to be merely illustrative and should not be construed to limit the scope of the inventive technology.

Relationally setting and dynamically adjusting voltage output limits (8) also may be effected in a variety of manners. As one example, a photovoltaic DC-DC power converter (2) may include a step function control (18). Embodiments may involve implementing a step function to dynamically adjust a dynamically adjustable voltage output limit (8), determining a resultant effect on an external state parameter, and repeating the steps until a desired result is achieved. For example, implementing a step function may involve adjusting a voltage output limit (8) incrementally, discretely, fractionally, or in a likewise manner with respect to an identified endpoint. The precise contours of the steps may be provided by hardware, software, or any other suitable modality. Following each stepwise adjustment, the result on an external state parameter may be observed. In this manner, the adjustment may approach the desired endpoint in a controlled fashion, perhaps avoiding risks such as overshooting the desired target of the adjustment and ensuring the adjustment is approached entirely from one side of the endpoint. As but one example, where it may be critical to avoid exceeding a regulatory voltage limit, utilizing a step function as described may ensure that voltages are raised without risk of exceeding the regulatory requirement.

Another example of how voltage output limits (8) may be relationally set and dynamically adjusted may involve first adjusting an external voltage to a safe condition. A safe condition may be a condition of a solar power system (3) that avoids an undesirable or adverse consequence to the system's operational state, such as perhaps exceeding a regulatory limit for voltage, providing an over-voltage input to an electrical component, or the like. One example of first adjusting an external voltage to a safe state may involve decreasing voltage output limits (8) for one photovoltaic DC-DC power converter (2) prior to raising voltage output limits (8) for another photovoltaic DC-DC power converter (2). In this manner, the risk of exceeding a regulatory voltage limit, even temporarily, may be reduced or eliminated. Accordingly, a photovoltaic DC-DC power converter (2) in various embodiments may include an external voltage safeguard control (19).

A further example of relationally setting and dynamically adjusting voltage output limits (8) may involve slaving a dynamically adjustable voltage output limit (8) in relation to one or more external state parameters. Slaving may involve setting or adjusting based on criteria, wherein some criteria may take precedence over other criteria. For example, embodiments may involve hierarchically slaving dynamically adjustable voltage output limits (8). Naturally, any hierarchy of criteria may be selected as appropriate consistent with the principles discussed herein. One possible hierarchy may involve first slaving a voltage output limit (8) to a regulatory parameter (for example, to avoid exceeding a regulatory voltage limit), second slaving a voltage output limit (8) to an operational parameter (for example, such as compensating for a voltage drop due to panel dropouts on a string (27)), and third slaving a voltage output limit (8) to an MPP parameter (for example, such as ensuring a solar energy source (1) is operated for MPP). Accordingly, in various embodiments a dynamically adjustable voltage output limit control (12) may be a slaved dynamically adjustable voltage output limit control (12) or even a hierarchically slaved dynamically adjustable voltage output limit control (12). Naturally, such hierarchically slaved controls may include primary slaved controls, secondary slaved controls, tertiary slaved controls, and the like correlated to various hierarchical priorities. For example, a primary control may be a regulatory primary slaved control, a secondary control may be an operational secondary slaved control, a tertiary control may be a MPP tertiary slaved control, and so forth.

Relationally setting and dynamically adjusting voltage output limits (8) also may involve utilizing a set point margin. Such a margin may provide a buffer zone between the maximum voltage output of one or more photovoltaic DC-DC power converters (2) and some absolute value. For example, in some embodiments an absolute value may be a regulatory voltage limit, and a set point margin may provide a buffer zone between the regulatory limit and the maximum output of a plurality of converters operating on a string. If the regulatory voltage limit for a string is 600 volts, for example, a set point margin may be established such that the combined maximum voltage output of all converters on the string may be 550 volts, thereby leaving a margin of 50 volts as a buffer zone between the converters' output and the regulatory limit. Naturally, establishing the set point margin may be done by relationally setting and dynamically adjusting voltage output limits (8) of photovoltaic DC-DC power converters (2). With reference to FIG. 8, for example, assume hypothetically it may be desirable to achieve a set point of 550 volts and a set point margin of 50 volts below a regulatory voltage limit of 600 volts. With reference to FIG. 8a, the voltage output limit (8) for each converter could be adjusted to 55 volts; with reference to FIG. 8b, the voltage output limit (8) for each converter could be adjusted to 68.75 volts; and with reference to FIG. 8c, the voltage output limit (8) for each converter could be adjusted to 78.5 volts. In each foregoing case, the total output voltage for the string would not exceed 550 volts, leaving a margin of 50 volts below the regulatory limit of 600 volts. Of course, a dynamically adjustable voltage output limit control (12) in this situation may be a set point margin control.

Another example of how voltage output limits (8) may be relationally set and dynamically adjusted may involve relationally setting or dynamically adjusting using a switch-mode modality, duty cycle modality, or the like, perhaps for example as discussed in International Patent Application No. PCT/US08/57105, filed Mar. 14, 2008, entitled "Systems for Highly Efficient Solar Power", hereby incorporated by reference herein in its entirety.

Of course, the foregoing examples of how voltage output limits (8) may be relationally set and dynamically adjusted are intended to be illustrative and should not be construed as limiting the scope of how voltage output limits (8) may be relationally set and dynamically adjusted consistent with the principles discussed herein.

Dynamically adjusting voltage output limits (8) in some situations may cause photovoltaic DC-DC power converters (2) or solar energy sources (1) to operate in a suboptimal manner. For example, FIG. 5 and FIG. 6 illustrate that power converters typically exhibit varying degrees of power loss as the input voltage moves off of a peak value. As shown in the figures, power losses may increase the further the input voltage varies from the optimum. Since dynamically adjusting voltage output limits (8) may permit a power converter to operate across a wider range of input voltages, as shown for example in FIGS. 6b and 6d, situations may arise where the converter becomes operated at a suboptimal efficiency, a suboptimal input voltage, a suboptimal power loss, a suboptimal MPP voltage for a solar energy source (1), or the like. While it may seem counterintuitive, especially in light of conventional wisdom regarding solar power generation, the inventive technology described herein may permit and even encourage such suboptimal power converter operation to degrees not before contemplated. In particular, the suboptimal operation of individual power converters may permit greater gains in a solar power system (3) as a whole, for example such as by allowing more solar energy sources (1) to be operated at MPP, or perhaps to allow strings (27) to keep operating even despite substantial numbers of reduced panel functionalities or panel dropouts. Accordingly, a photovoltaic DC-DC power converter (2) in various embodiments may include controls to intentionally operate the converter in a suboptimal modality, such as a suboptimal efficiency control (14), a suboptimal input voltage control (15), a suboptimal power loss control (16), a suboptimal MPP voltage control (17), or the like.

In various embodiments, providing an external state parameter to a photovoltaic DC-DC power converter (2) may involve providing at least one intra-string parameter, such as wherein the external state parameter may be for a condition of some or all of a string (27) on which the converter is located. Similarly, embodiments may involve providing at least one inter-string parameter, such as wherein the external state parameter may be for a condition on some or all of a string (27) on which the power converter is not located. In this manner, a photovoltaic DC-DC power converter (2) in various embodiments perhaps may be responsive to an intra-string data interface (25) (responsive for example to conditions within a string (27) on which the converter is located) or an inter-string data interface (26) (responsive for example to conditions for a string (27) on which the converter is not located).

Intra-string and inter-string parameters may be utilized to achieve a desired condition for a string (27) or a desired inter-string condition when dynamically adjusting a voltage output limit (8). In this manner, a dynamically adjustable voltage output limit control (12) in fact may serve as an intra-string control or an inter-string control. Examples of desired intra-string conditions or inter-string conditions may include a desired voltage for the string or a desired inter-string voltage among strings (effected for example perhaps by a desired string or inter-string voltage control), a nontraditionally high voltage for the string or a nontraditionally high inter-string voltage among strings (effected for example perhaps by a nontraditionally high string or inter-string voltage control), a near regulatory limit voltage for the string or near regulatory inter-string voltage among strings (effected for example perhaps by a near regulatory limit string or inter-string voltage control), or the like. Nontraditionally high voltages may be valued with respect to conventional solar power systems, which for example may typically be operated in the range of 200 volts to 400 volts. Similarly, near regulatory limit voltages may be valued with respect to a conventional regulatory limit voltage or regulatory voltage requirement, which for example frequently may be 600 volts.

Moreover, in certain embodiments, an intra-string or inter-string parameter may be greater than 400 volts for a string or an inter-string voltage of greater than 400 volts (effected for example perhaps by a 400 volt minimum string or inter-string voltage control), greater than 450 volts for a string or an inter-string voltage of greater than 450 volts (effected for example perhaps by a 450 volt minimum string or inter-string voltage control), greater than 500 volts for a string or an inter-string voltage of greater than 500 volts (effected for example perhaps by a 500 volt minimum string or inter-string voltage control), greater than 550 volts for a string or an inter-string voltage of greater than 550 volts (effected for example perhaps by a 550 volt minimum string or inter-string voltage control), greater than 65% of the regulatory voltage requirement for an intra-string voltage or inter-string voltage (effected for example perhaps by a 65% regulatory requirement minimum string or inter-string voltage control), greater than 70% of the regulatory voltage requirement for an intra-string voltage or inter-string voltage (effected for example perhaps by a 70% regulatory requirement minimum string or inter-string voltage control), greater than 75% of the regulatory voltage requirement for an intra-string voltage or inter-string voltage (effected for example perhaps by a 75% regulatory requirement minimum string or inter-string voltage control), greater than 80% of the regulatory voltage requirement for an intra-string voltage or inter-string voltage (effected for example perhaps by a 80% regulatory requirement minimum string or inter-string voltage control), greater than 85% of the regulatory voltage requirement for an intra-string voltage or inter-string voltage (effected for example perhaps by a 85% regulatory requirement minimum string or inter-string voltage control), greater than 90% of the regulatory voltage requirement for an intra-string voltage or inter-string voltage (effected for example perhaps by a 90% regulatory requirement minimum string or inter-string voltage control), and greater than 95% of the regulatory voltage requirement for an intra-string voltage or inter-string voltage (effected for example perhaps by a 95% regulatory requirement minimum string or inter-string voltage control).

With further respect to the foregoing voltages, providing an intra-string parameter to a photovoltaic DC-DC power converter (2) in some embodiments may involve providing a voltage for the intra-string element. An intra-string element may be merely something else located on the same string (27) on which the converter may be located, such as perhaps the combination of another intra-string solar energy source (1) connected to another intra-string photovoltaic DC-DC power converter (2) serially located on the same string (27). In these cases, an intra-string data interface to which a photovoltaic DC-DC power converter (2) in various embodiments may be responsive may be an intra-string element voltage data interface.

Similarly, providing an inter-string parameter to a photovoltaic DC-DC power converter (2) in some embodiments may involve providing a voltage for an external string (27), such as perhaps a string (27) other than the string (27) on which the power converter is located. In these cases, an inter-string data interface to which a photovoltaic DC-DC power converter (2) in various embodiments may be responsive may be an external string voltage data interface.

Moreover, dynamically adjusting a voltage output limit (8) for the power converter may involve utilizing the intra-string or inter-string parameter to achieve a desired condition for a string (27), desired inter-string condition, or the like. For example, such utilization may involve compensating for the voltage of an intra-string element or external string (27) (for example, such as wherein an intra-string control may be an intra-string element voltage compensation control and an inter-string control may be an external string voltage compensation control), perhaps such as consistent with the principles described elsewhere herein.

Various embodiments may involve compensating for an increased voltage output (for example, such as a voltage spike caused by reflectivity or other high insolation conditions) of an intra-string element or external string (utilizing for example perhaps an intra-string solar energy source or external string voltage output increase compensation control), compensating for a decreased voltage output (for example, such as clouding or other low insolation conditions) of an intra-string element or external string (utilizing for example perhaps an intra-string solar energy source or external string voltage output decrease compensation control), compensating for dropout (for example, such as sudden failure of one or more sources on a string) of an intra-string element or external string (utilizing for example perhaps an intra-string solar energy source or external string voltage output dropout compensation control), compensating for shading (for example, such as due to daily or seasonal moving patterns of shade) of an intra-string element or external string (utilizing for example perhaps a shaded intra-string solar energy source or external string compensation control), compensating for blockage (for example, such as due to the buildup of dirt or other debris) of an intra-string element or external string (utilizing for example perhaps a blocked intra-string solar energy source or external string compensation control), compensating for damage (for example, such as due to weather, manmade, or other events) to an intra-string element or external string (utilizing for example perhaps a damaged intra-string or external string solar energy source compensation control), compensating for malfunctioning (for example, due to mechanical failures or other causes) of an intra-string element or external string (utilizing for example perhaps an intra-string solar energy source or external string malfunction compensation control), compensating for non-uniformity (for example, due to different makes or models of equipment) in an intra-string element or external string (utilizing for example perhaps a non-uniform intra-string solar energy source or external string compensation control), or the like.

Of course, the inventive technology should be considered to encompass plural embodiments of the methods and apparatus discussed herein. For example, embodiments may include a plurality of solar energy sources (1), each having a DC photovoltaic output, and a plurality of photovoltaic DC-DC power converters (2), each having a DC photovoltaic input that accepts power from at least one DC photovoltaic output, an external state data interface (7), a dynamically adjustable voltage output limit control (12), and a converted DC photovoltaic output. Dynamically adjusting a voltage output limit (8) for a photovoltaic DC-DC power converter (2) of course may include dynamically adjusting voltage output limits (8) for a plurality of power converters in any combination consistent with the principles discussed herein, perhaps including power converters located on the same string (27) or even different strings (27), and perhaps utilizing any combination of intra-string and inter-string parameters, data interfaces, and controls as may be appropriate to achieve any desired string conditions or even inter-string conditions. Similarly, providing an external state parameter to a photovoltaic DC-DC power converter (2) may include providing any number of external state parameters to any plurality of power converters in any combination, and dynamically adjustable voltage output limits (8) may be relationally set or dynamically adjusted in relation to the provided external state parameters in any plurality of power converters in any combination, all as consistent with the principles discussed herein. As but one example, some situations may involve providing a voltage output of one photovoltaic DC-DC power converter (2) to another photovoltaic DC-DC power converter (2), and relationally setting a voltage output limit (8) in response thereto, though of course this example is merely illustrative and should not be construed to limit the various possible combinations as just described.

As can be easily understood from the foregoing, the basic concepts of the present inventive technology may be embodied in a variety of ways. It involves both voltage output limitation techniques as well as devices to accomplish the appropriate voltage output limiting. In this application, the voltage output limitation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not—and, conversely, were there effectively disclosure of the act of "converting", such a disclosure should be understood to encompass disclosure of a "converter" and even a "means for converting." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that, to the extent consistent with applicable law governing the construction of terminology in patents and patent applications, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference or other information statement filed with the application or in the table below are hereby appended and hereby incorporated by reference in their entirety, however, as to each of the above, to the extent that such information or statements incorporated by reference might be considered inconsistent with the patenting of this/these inventive technology(s) such statements are expressly not to be considered as made by the applicant(s).

| I. U.S. PATENT | | |
|---|---|---|
| Pat. No. | Issue Date | Inventor/Applicant |
| 4,127,797 | Nov. 28, 1978 | Perper |
| 4,168,124 | Sep. 18, 1979 | Pizzi |
| 4,218,139 | Aug. 19, 1980 | Sheffield |
| 4,222,665 | Aug. 16, 1980 | Tacjozawa et al. |
| 4,249,958 | Feb. 10, 1981 | Baudin et al. |
| 4,341,607 | Jul. 27, 1982 | Tison |

-continued

| Pat. No. | Issue Date | Inventor/Applicant |
|---|---|---|
| 4,375,662 | Mar. 1, 1983 | Baker |
| 4,390,940 | Jun. 28, 1983 | Corbefin et al. |
| 4,404,472 | Sep. 13, 1983 | Steigerwald |
| 4,445,030 | Apr. 24, 1984 | Carlson |
| 4,445,049 | Apr. 24, 1984 | Steigerwald |
| 4,513,167 | Apr. 23, 1985 | Brandstetter |
| 4,528,503 | Jul. 9, 1985 | Cole |
| 4,580,090 | Apr. 1, 1986 | Bailey et al. |
| 4,581,716 | Apr. 8, 1986 | Kamiya |
| 4,616,983 | Dec. 2, 1986 | Harada et al. |
| 4,619,863 | Oct. 28, 1986 | Taylor |
| 4,725,740 | Feb. 16, 1988 | Nakata |
| 4,749,982 | Jun. 7, 1988 | Rikuna et al. |
| 4,794,909 | Jan. 3, 1989 | Elden |
| 4,873,480 | Oct. 10, 1989 | Lafferty |
| 4,896,034 | Jan. 23, 1990 | Kiriseko |
| 4,899,269 | Feb. 6, 1990 | Rouzies |
| 4,922,396 | May 1, 1990 | Niggemeyer |
| 5,027,051 | Jun. 25, 1991 | Lafferty |
| 5,028,861 | Jul. 2, 1991 | Pace et al. |
| 5,179,508 | Jan. 12, 1993 | Kernahan, et al. |
| 5,179,508 | Jan. 12, 1993 | Lange et al. |
| 5,401,561 | Mar. 28, 1995 | Fisun et al. |
| 5,493,204 | Feb. 20, 1996 | Caldwell |
| 5,503,260 | Apr. 2, 1996 | Riley |
| 5,646,502 | Jul. 8, 1997 | Johnson |
| 5,648,731 | Jul. 15, 1997 | Decker et al. |
| 5,669,987 | Sep. 23, 1997 | Takehara et al. |
| 5,689,242 | Nov. 18, 1997 | Sims et al. |
| 5,741,370 | Apr. 21, 1998 | Hanoka |
| 5,747,967 | May 5, 1998 | Muljadi et al. |
| 5,896,281 | Apr. 20, 1999 | Bingley |
| 5,923,100 | Jul. 13, 1999 | Lukens et al. |
| 5,932,994 | Aug. 3, 1999 | Jo, et al. |
| 6,046,401 | Apr. 4, 2000 | McCabe |
| 6,081,104 | Jun. 27, 2000 | Kern |
| 6,124,769 | Sep. 26, 2000 | Igarashi et al. |
| 6,180,868 | Jan. 30, 2001 | Yoshino et al. |
| 6,181,590 | Jan. 30, 2001 | Yamane et al. |
| 6,218,820 | Apr. 17, 2001 | D'Arrigo et al. |
| 6,278,052 | Aug. 21, 2001 | Takehara et al. |
| 6,281,485 | Aug. 28, 2001 | Siri |
| 6,282,104 | Aug. 28, 2001 | Kern |
| 6,314,007 | Nov. 6, 2001 | Johnson, Jr. et al. |
| 6,331,670 | Dec. 18, 2001 | Takehara et al. |
| 6,351,400 | Feb. 26, 2002 | Lumsden |
| 6,369,462 | Apr. 9, 2002 | Siri |
| 6,433,522 | Aug. 13, 2002 | Siri |
| 6,433,992 | Aug. 13, 2002 | Nakagawa et al. |
| 6,441,896 | Aug. 27, 2002 | Field |
| 6,448,489 | Sep. 10, 2002 | Kimura et al. |
| 6,493,246 | Dec. 10, 2002 | Suzui, et al. |
| 6,515,215 | Feb. 4, 2003 | Mimura |
| 6,624,350 | Sep. 23, 2003 | Nixon et al. |
| 6,670,721 | Dec. 30, 2003 | Lof et al. |
| 6,686,533 | Feb. 3, 2004 | Raum et al. |
| 6,750,391 | Jun. 15, 2004 | Bower et al. |
| 6,791,024 | Sep. 14, 2004 | Toyomura |
| 6,804,127 | Oct. 12, 2004 | Zhou |
| 6,889,122 | May 3, 2005 | Perez |
| 6,914,418 | Jul. 5, 2003 | Sung |
| 6,914,418 | Jul. 5, 2005 | Sung |
| 6,920,055 | Jul. 19, 2005 | Zeng et al. |
| 6,952,355 | Oct. 4, 2005 | Rissio et al. |
| 6,958,922 | Oct. 25, 2005 | Kazem |
| 6,984,965 | Jan. 10, 2006 | Vinciarelli |
| 6,984,970 | Jan. 10, 2006 | Capel |
| 7,046,531 | May 16, 2006 | Zocchi et al. |
| 7,091,707 | Aug. 15, 2006 | Cutler |
| 7,158,395 | Jan. 2, 2007 | Deng et al. |
| 7,193,872 | Mar. 20, 2007 | Siri |
| 7,227,278 | Jun. 5, 2007 | Realmuto et al. |
| 7,274,975 | Sep. 25, 2007 | Miller |
| 7,333,916 | Feb. 19, 2008 | Warfield et al. |
| 7,471,073 | Dec. 30, 2008 | Rettenwort et al. |
| 6,545,211 B1 | Apr. 8, 3002 | Mimura |
| 7,019,988 B2 | Mar. 28, 2006 | Fung et al. |
| 7,365,661 B2 | Apr. 29, 2008 | Thomas |
| 4,274,044 | Jun. 16, 1981 | Barre |

-continued

| | | | |
|---|---|---|---|
| 5,493,155 A | Feb. 20, 1996 | Okamoto et al. | |
| 6,686,727 B2 | Feb. 3, 2004 | Ledenev et al. | |

II. U.S. PATENT APPLICATION PUBLICATIONS

| Publication Number | Publication Date | Inventor |
|---|---|---|
| 20010007522 A1 | Jul. 12, 2001 | Nakagawa et al. |
| 20030075211 A1 | Apr. 24, 2003 | Makita et al. |
| 20030075211 A1 | Apr. 24, 2003 | Makita et al. |
| 20040095020 A1 | May 20, 2004 | Kernahan, et al. |
| 20040135560 A1 | Jul. 15, 2004 | Kernahan et al. |
| 20040164557 A1 | Aug. 26, 2004 | West |
| 20040207366 A1 | Oct. 21, 2004 | Sung |
| 20040211456 A1 | Oct. 28, 2004 | Brown, Jacob E et al. |
| 20050002214 A1 | Jan. 6, 2005 | Deng et al. |
| 20050068012 A1 | Mar. 31, 2005 | Cutler |
| 20050109386 A1 | May 26, 2005 | Marshall |
| 20050121067 A1 | Jun. 9, 2005 | Toyomura |
| 20050162018 A1 | Jul. 28, 2005 | Realmuto et al. |
| 20050254191 A1 | Nov. 17, 2005 | Bashaw et al. |
| 20060017327 A1 | Jan. 26, 2006 | Siri et al. |
| 20060103360 A1 | May 18, 2006 | Cutler |
| 20060162772 A1 | Jul. 27, 2006 | Preser et al. |
| 20060171182 A1 | Aug. 3, 2006 | Siri et al. |
| 20060174939 A1 | Aug. 10, 2006 | Matan |
| 20070024257 A1 | Feb. 1, 2007 | Boldo |
| 20070035975 A1 | Feb. 15, 2007 | Dickerson et al. |
| 20070044837 A1 | Mar. 1, 2007 | Simburger, et al. |
| 20070069520 A1 | Mar. 29, 2007 | Schetters |
| 20070111103 A1 | Jun. 19, 2003 | Konishiike et al. |
| 20070119718 A1 | May 31, 2007 | Gibson et al. |
| 20070133241 A1 | Jun. 14, 2007 | Mumtaz et al. |
| 20070159866 A1 | Jul. 12, 2007 | Siri |
| 20070171680 A1 | Jul. 26, 2007 | Perreault et al. |
| 20070236187 A1 | Oct. 11, 2007 | Wai et al. |
| 20080036440 A1 | Feb. 14, 2008 | Garmer |
| 20080062724 A1 | Mar. 13, 2008 | Feng et al. |
| 20080101101 A1 | May 1, 2008 | Iwata et al. |
| 20080111517 A1 | May 15, 2008 | Pfeifer, et al. |
| 20080123375 A1 | May 29, 2008 | Beardsley |
| 20080136367 A1 | Jun. 12, 2008 | Adest et al. |
| 20080144294 A1 | Jun. 19, 2008 | Adest et al. |
| 20080147335 A1 | Jun. 19, 2008 | Adest et al. |
| 20080150366 A1 | Jun. 26, 2008 | Adest et al. |
| 20080247201 A1 | Oct. 9, 2008 | Perol |
| 20080257397 A1 | Oct. 23, 2008 | Glaser, et al. |
| 20080164766 A1 | Jul. 10, 2008 | Adest et al. |
| 20080143188 A1 | Jun. 19, 2008 | Adest et al. |
| 20010032664 A1 | Oct. 25, 2001 | Takehara et al. |
| 20030062078 A1 | Apr. 3, 2003 | Mimura |
| 20080186004 A1 | Aug. 7, 2008 | Williams |

III. FOREIGN PATENT DOCUMENTS

| Country Code | Patent/ Publication No. | Kind Code | Pub/Issue Date | Inventor/Applicant |
|---|---|---|---|---|
| EP | 677,749 | A2 | Oct. 18, 1996 | Canon Kabushiki |
| EP | 677,749 | A3 | Jan. 17, 1996 | Canon Kabushiki |
| EP | 780,750 | B1 | Mar. 27, 2002 | Nakata et al. |
| EP | 824,273 | A2 | Feb. 18, 1998 | Canon Kabushiki Kaisha |
| EP | 964,415 | A1 | Dec. 15, 1999 | Igarashi, Katsuhiko-TDK Corp. |
| EP | 964,457 | A2 | Dec. 15, 1999 | Canon Kabushiki Kaisha |
| EP | 964,457 | A3 | Dec. 15, 1999 | Canon Kabushiki Kaisha |
| EP | 978,884 | A3 | Mar. 22, 2000 | Canon Kabushiki Kaisha |
| EP | 1,120,895 | A3 | May 6, 2004 | Murata Manufacturing Co. et al. |
| FR | 612,859 | | Nov. 18, 1948 | Standard Telephones and Cables Limited |
| GB | 310,362 | | Sep. 26, 1929 | Rheinishce Metallwaaren-und Maschinenfabrik Sommer |
| GB | 612,859 | | Nov. 18, 1948 | Standard Telephones and Cables Limited |
| GB | 1,231,961 | | Sep. 9, 1969 | Panajula Karajanni |
| GB | 2,415,841 | A | Jan. 4, 2006 | Enecsys Limited et al. |
| GB | 2,419,968 | A | May 10, 2006 | Enecsys Limited, et al. |
| GB | 2,421,847 | A | Jul. 5, 2006 | Enecsys Limited, et al. |
| GB | 2,434,490 | A | Jul. 25, 2007 | Enecsys Limited, et al. |
| GB | 2,434,490 | A | Jul. 25, 2007 | Enecsys Limited |
| JP | 5,003,678 | A2 | Jan. 8, 1993 | Toshiba F EE Syst KK, et al. |
| JP | 6,035,555 | A2 | Feb. 10, 1994 | Japan Storage Battery Co. Ltd. |
| JP | 6,141,261 | A2 | May 20, 1994 | Olympus Optical Co. Ltd. |
| JP | 7,026,849 | U2 | Jan. 27, 1995 | Sekisui House Ltd. |
| JP | 7,222,436 | A2 | Aug. 18, 1995 | Meidensha Corp. |
| JP | 8,033,347 | A2 | Feb. 2, 1996 | Hitachi Ltd. et al. |
| JP | 8,066,050 | A2 | Mar. 8, 1996 | Hitachi Ltd. |
| JP | 8,181,343 | A2 | Jul. 12, 1996 | Sharp Corp. |
| JP | 8,204,220 | A2 | Aug. 9, 1996 | Mitsubishi Electric Corp. |
| JP | 9,097,918 | A2 | Apr. 8, 1997 | Canon Inc. |
| JP | 56/042,365 | A2 | Apr. 20, 1981 | Seiko Epson Corp. |
| JP | 60/027,964 | A2 | Feb. 3, 1985 | NEC Corp. |
| JP | 60/148,172 | A2 | Aug. 5, 1985 | Seikosha Co. Ltd. |
| JP | 62/154,121 | A2 | Sep. 7, 1987 | Kyogera Corp. |
| JP | 2000020150 | A2 | Jan. 21, 2000 | Toshiba Fa Syst Eng Corp. et al. |
| JP | 2002231578 | A2 | Aug. 16, 2002 | Meidensha Corp. |
| JP | 2002231578 | A | Aug. 16, 2002 | Meidensha Corp. |
| JP | 2007058843 | A | Aug. 3, 2007 | Gunma Prefecture Despac KK |
| JP | 2007104872 | A | Apr. 19, 2007 | Ebara Densan Ltd. |
| JP | 2007225625 | A | Jun. 9, 2007 | Ahei Toyoji |
| JP | 2001-1086765 | A | Mar. 30, 2001 | Powerware Corp. |
| KR | 102005-0071689 | A | Jul. 7, 2005 | Fyre Storm, Inc. |
| KR | 102006-0060825 | A | Jul. 6, 2006 | Lee, Seong Ryong |
| KR | 102008-0092747 | A | Oct. 16, 2008 | Industry-Academic Coop Foundation of Kyungnam Univ |
| WO | 200708429 | A2 | Jul. 19, 2007 | Enecsys Ltd. |
| WO | 2003036688 | A2 | Apr. 3, 2003 | Pharmaderm Laboratories, Ltd. |
| WO | 2004100344 | A2 | Nov. 18, 2004 | Ballard Power Systems Corp. |
| WO | 2004100348 | A1 | Nov. 18, 2004 | Enecsys Limited |
| WO | 2005027300 | A1 | Mar. 24, 2005 | Solarit AB |
| WO | 2005036725 | A1 | Apr. 21, 2005 | Konin-Klijke Philips Electronics |
| WO | 2006005125 | A1 | Jan. 19, 2006 | Central Queensland University et al. |
| WO | 2006013600 | A2 | Feb. 9, 2006 | Universita Degli Studi DiRoma "La Sapienza" |
| WO | 2006013600 | A3 | Feb. 9, 2006 | Universita Degli Studi DiRoma "La Sapienza" |
| WO | 2006048688 | A1 | May 11, 2006 | Enecsys Limited |
| WO | 2006048689 | A2 | May 11, 2006 | Enecsys Limited |
| WO | 2006048689 | A3 | May 11, 2006 | Enecsys Limited |
| WO | 2006071436 | A2 | Jul. 6, 2006 | ISG Technologies, LLC |
| WO | 2006078685 | A2 | Jul. 27, 2006 | Presher, Gordon E. Jr. & Warren, Carlson L. |
| WO | 2006078685 | A2 | Jul. 27, 2006 | Presher, Gordon E. Jr. |
| WO | 2006090675 | | Aug. 31, 2006 | Iwata, et al. |
| WO | 2006117551 | A2 | Nov. 9, 2006 | Lontra Environmental Technology Ltd. |
| WO | 2006137948 | A2 | Dec. 28, 2006 | ISG Technologies, LLC |
| WO | 2007007360 | A2 | Jan. 18, 2007 | Universita Degli Studi Di Salerno |
| WO | 2007080429 | A2 | Jul. 19, 2007 | Enecsys Limited |
| WO | 2007142693 | A3 | Dec. 13, 2007 | GM Global Technology Operations, Inc. |

| | | | | |
|---|---|---|---|---|
| WO | 2008069926 | A3 | Dec. 6, 2008 | ITT Manufacturing Enterprises, Inc. |
| WO | 20020073785 | A1 | Sep. 19, 2002 | International Power Systems, Inc. |
| WO | 90/03680 | | Apr. 5, 1990 | Electric Power Research Institute, Inc. |

IV. NON-PATENT LITERATURE DOCUMENTS

"Solar Sentry's Competitive Advantage," 1 page with table summarizing Solar Sentry's sustainable competitive advantage over two primary alternative approaches
ANON SOURCE; International Symposium on Signals, Circuits and Systems, Jul. 12-13, 2007; Iasi, Romania; Publisher: Institute of Electrical and Electroncis Engineers Computer Society; Abstract.
ASSOCIATION FOR APPLIED SOLAR ENERGY, Alt. Journal; Uniform Title: "Solar energy (Photnix, AZ); Key Title: Solar energy; Preceding Title: Journal of solar energy, science and engineering; Standard No: ISSN: 0038-092X CODEN: SRENA4. No abstract available.
BASCOPE, G. V. T.; Barbi, I; "Generation of a Family of Non-isolated DC-DC PWM Converters Using New Three-state Switching Cells;" 2000 IEEE 31st Annual Power Electronics Specialists Conference in Galway, Ireland; Vol. 2, pp 858-863; Abstract.
Bower, et al. "Innovative PV Micro-Inverter Topology Eliminates Electrolytic Capacitors for Longer Lifetime," 1-4244-0016-3-06 IEEE p. 2038
Cambridge Consultants - Brochure - Interface 43
CASE, M. J.; "Minimum Component Photovoltaic Array Maximum Power Point Tracker," Vector (Electrical Engineering), June 1999; p 4-8; Abstract.
Tse, K. K. et al. "A Novel Maximum Power Point Tracking Technique for PV Panels;" Dept. of Electronic Engineering, City Univerisity of Hong Kong; Source: PESC Record - IEEE Annual Power Electronics Specialists Conference, v 4, 2001, p 1970-1975, Jun. 17-21, 2001; Abstract.
CUADRAS, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp 78-82 and 12-15. Abstract.
DAHER, Sergio; "Analysis, Design and Implementation of a High Efficiency Multilevel Converter for Renewable Energy Systems," Kassel University Press, ISBN: 978-3-89958-236-9, 2006, 147 pages. Abstract.
Dallas Semiconductor; Battery I.D. chip from Dallas Semiconductor monitors and reports battery pack temperature, Bnet World Network, Jul. 10, 1995
DeDoncker, Rik; "Power Converter for PV-Systems," Institute for Power Electrical Drives, RWTH Aachen Univ.
de Haan, S. W. H., et al; Test results of a 130 W AC module, a modular solar AC power station, Photovoltaic Energy Conversion, 1994; Conference Record of the 24th IEEE Photovoltaic Specialists Conference Dec. 5-91994; 1994 IEEE First World Conference, Volume 1, Pages 925-928
DEHBONEI, Hooman; Corp author(s): Curtin University of Technology, School of Electrical and Computer Engineering; 2003; Description: xxi, 284 leaves; ill.; 31 cm. Dissertation: Thesis. Abstract
DOOYONG, Jung; "Soft Switching Boost Converter for Photovoltaic Power Generation System;" http://www.conftool.com/epe-pemc2008/index.php?page=browseSessions&form_session=26&presentations=show&metadata=show, abstract.
DUAN, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article Number 4582577. Abstract.
DUNCAN, Joseph, 1981, Corp Author(s): Massachussetts Institute of Technology, Dept. of Electrical Engineering and Computer Science; 2005, Description: 80p.: ill.; 29 cm. Dissertation: Thesis (M. Eng.). Abstract.
EDELMOSER, Karl H. and Himmelstoss, Felix A; "High Efficiency DC-to-AC Power Inverter with Special DC Interface; Automatika 46 (2005) 3-4, 143-148, Professional Paper, ISSN 0005-1144.
ENRIQUE, J. M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages).
ENSLIN, J. H. R.; "Integrated Photovoltaic Maximum Power Point Tracking Converter;" Industrial Electronics, IEEE Transactions on Volume 44, Issue 6, December 1997, Pages 769-773; http://ieeexplore.ieee.org/Xplore/login.jsp?url=/ie13/41/14174/00649937.pdf?temp=x.
ERTL, H; Kolar, J. W.; Zach, F. C.; "A Novel Multicell DC-AC Converter for Applications in Renewable Energy Systems;" IEEE Transactions on Industrial Electronics, October 2002; vol. 49, Issue 5, pp 1048-1057; Abstract.
ESMAILI, Gholamreza; "Application of Advanced Power Electronics in Renewable Energy Sources and Hygrid Generating Systems, Ohio State University, Graduate Program in Electrical and Computer Engineering, 2006, Dissertation.
European patent application no 1999111425 filed Nov. 6, 1999; and various office actions
Gomez, M; "Consulting in the solar power age," IEEE-CNSV: Consultants' Network of Silicon Valley, Nov. 13, 2007
Guo, G. Z.; "Design of a 400 W, 1 Omega, Buck-boost Inverter for PV Applications," 32nd Annual Canadian Solar Energy Conference, Jun. 10, 2007
Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; page 2255
Ho, Billy M. T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p 1559-1565. Abstract.
Ho, Billy M. T.; "An Integrated Inverter with Maximum Power Tracking for Grid-Connected PV Systems;" Department of Electronic Engineering, City University of Hong Kong; IEEE Transactions on Power Electronics, v 20, n 4, July 2005; p 953-962. Abstract.
http://www.solarsentry.com; Protecting Your Solar Investment, 2005, Solar Sentry Corp.
Hua, C et al; "Control of DC-DC Converters for Solar energy System with Maximum Power Tracking," Department of Electrical Engineering; National Yumin University of Science & Technology, Taiwan; Volume 2, Nov. 9-14, 1997; Pages 827-832
International Application filed Apr. 15, 2008, Ser. No. PCT/US08/60345
International Application filed Jul. 18, 2008, Ser. No. PCT/US08/70506
International Application filed Mar. 14, 2008, Ser. No. PCT/US08/57105
International Application filed Oct. 10, 2008, Ser. No. PCT/US08/79605
International Application Number PCT/US08/57105, International Search Report dated Jun. 25, 2008
International Application Number PCT/US08/57105, Written Opinion dated Jun. 25, 2008
International Application Number PCT/US08/60345, International Search Report dated Aug. 18, 2008
International Application Number PCT/US08/60345, Written Opinion dated Aug. 18, 2008
International Application Number PCT/US08/70506, International Search Report dated Sep. 26, 2008
International Application Number PCT/US08/70506, Written Opinion dated Sep. 26, 2008
JOO, Hyuk Lee; "Soft Switching Multi-Phase Boost Converter for Photovoltaic System," http://www.conftool.com/epe-pemc2008/index.php?page=browseSessions&form_session=26&presentations=show&metadata=show,abstract.
KAIWEI, Yao, Mao, Ye; Ming, Xu; Lee, F. C.; "Tapped-inductor Buck Converter for High-step-down DC-DC Conversion," IEEE Transactions on Power Electronics, Vol. 20, Issue 4, July 2005; pp 775-780; Abstract.
Kang, F et al; "Photovoltaic Power Interface Circuit Incorporated with a Buck-boost Converter and a Full-bridge Inverter;' doi: 10.1016-j.apenergy.2004.10.009
Kern, G; "SunSine (TM)300: Manufacture of an AC Photovoltaic Module,"Final Report, Phases I & II, Jul. 25, 1995-Jun. 30, 1998; National Renewable Energy Laboratory, March 1999; NREL-SR-520-26085
Kretschmar, K et al; "An AC Converter with a Small DC Link Capacitor for a 15 kW Permanent Magnet Synchronous Integral Motor, Power Electronics and Variable Speed Drive," 1998; 7th International Conference; Conf. Publ. No. 456; Sept. 21-23, 1998; Pages 622-625
Kroposki, H. Thomas and Witt, B & C; "Progress in Photovoltaic Components and Systems," National Renewable Energy Laboratory, May 200; NREL-CP-520-27460
KUO, J.-L.; "Duty-based Control of Maximum Power Point Regulation for Power Converter in Solar Fan System with Battery Storage," http:www.actapress.com/PaperInfo.aspx?PaperID=30260&reason=500, abstract.
Lim, Y. H. et al; "Simple Maximum Power Point Tracker for Photovoltaic Arrays," Electronics Letters May 25, 2000; Vol. 36, No. 11
Linear Technology Specification Sheet, LTM4607
Matsuo, H et al; "Novel Solar Cell Power Supply System using the Multiple-input DC-DC Converter;' Telecommunications Energy Conference, 1998; INTELEC, 20th International, Pages 797-8022

MUTOH, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p 2264-2271. Abstract.

MUTOH, Nobuyoshi; "A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p 97-103. Abstract.

NISHIDA, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p 1785-1790. Abstract.

Oldenkamp, H. et al; "AC Modules: Past, Present and Future, Workshop Installing the Solar Solution; pp 22-23; January 1998; Hatfield, UK POWER ARTICLE, Aerospace Systems Lab, Washington University, St. Louis, MO;

Presher, Gordon E. Jr. (first named inventor); Portion of File Wrapper, Information Disclosure Statement by Applicant; Attorney Docket Number 1199 001 301 0202

QUAN, Li; Wolfs, P; "An Analysis of the ZVS Two-inductor Boost Converter Under Variable Frequency Operation," IEEE Transactions on Power Electronics, Central Queensland University, Rockhamton, Qld, AU; Vol. 22, No. 1, January 2007; pp 120-131. Abstract.

RAJAN, Anita; "Maximum Power Point Tracker Optimized for Solar Powered Cars;" Society of Automotive Engineers, Transactions, v 99, n Sect 6, 1990, p 1408-1420; Abstract.

REIMANN, T, Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp 978-984. Abstract.

Rodriguez, C; "Analytic Solution to the Photovoltaic Maximum Power Point Problem;" IEEE Transactions of Power Electronics, Vol. 54, No. 9, September 2007

Roman, E et al; "Intelligent PV Module for Grid-Connected PV Systems;" IEEE Transactions of Power Electronics, Vol. 53, No. 4, August 2006

Russell, M. C. et al; "The Massachusetts Electric Solar Project: A Pilot Project to Commercialize Residential PC Systems," Photovoltaic Specialists Conference 2000; Conference Record of the 28th IEEE; Pages 1583-1586

SatCon Power Systems, PowerGate Photovoltaic 50 kW Power Converter System; Spec Sheet; June 2004

Schekulin, Dirk et al; "Module-integratable Inverters in the Power-Range of 100-400 Watts," 13th European Photovoltaic Solar Energy Conference, Oct. 23-27, 1995; Nice, France; p 1893-1896

Shimizu, et al; "Generation Control Circuit for Photovoltaic Modules," IEEE Transactions on Power Electronics; Vol. 16, No. 3, May 2001

SIRI, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp 228-234.

solar-electric.com; Northern Arizona Wind & Sun, "All About MPPT Solar Charge Controllers; Nov. 5, 2007

Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32

United States Provisional Application filed Dec. 6, 2006, Ser. No. 60/868,851

United States Provisional Application filed Dec. 6, 2006, Ser. No. 60/868,893

United States Provisional Application filed Dec. 7, 2006, Ser. No. 60/868,962

United States Provisional Application filed Mar. 26, 2007, Ser. No. 60/908,095

United States Provisional Application filed May 9, 2007, Ser. No. 60/916,815

United States Provisional Application filed Nov. 15, 2007, Ser. No. 60/986,979

United States Provisional Application filed Oct. 15, 2007, Ser. No. 60/980,157

United States Provisional Application filed Oct. 23, 2007, Ser. No. 60/982,053

Walker, G. R. et al; "Cascaded DC-DC Converter Connection of Photovoltaic Modules," IEEE Transactions of Power Electronics, Vol. 19, No. 4, July 2004

Walker, G. R. et al; "PV String Per-Module Power Point Enabling Converters," School of Information Technology and Electrical Engineering; The University of Queensland, presented at the Australasian Universities Power Engineering Conference, Sept. 28-Oct. 1, 2003 in Christchurch; AUPEC2003

Wang, Ucilia; Greentechmedia; "National semi casts solarmagic;" www.greentechmedia.com; Jul. 2, 2008

XUE, John, "PV Module Series String Balancing Converters," Supervised by Geoffrey Walker, Nov. 6, 2002; University of Queensland, School of Information Technology and Electrical Engineering.

YUVARAJAN, S; Dachuan, Yu; Shanguang, Xu; "A Novel Power Converter for Photovoltaic Applications," Journal of Power Sources, Sep. 3, 2004; Vol. 135, No. 1-2, Pages 327-331; Abstract.

Feuermann, D. et al., Reversible low solar heat gain windows for energy savings. The Jacob Blaustein Institute, Israel.

Román, E., et al. Experimental results of controlled PV module for building integrated PV systems; Science Direct; Solar Energy, Volume 82, Issue 5, May 2008, Pages 471-480

Linares, L., et al. Improved Energy Capture in Series String Photovoltaics via Smart Distributed Power Electronics; Proceedings APEC 2009: 24th Annual IEEE Applied Power Electronics Conference. Washington, D. C., February, 2009

Thus, the applicant(s) should be understood to have support to claim and make a statement of invention to at least: i) each of the solar power devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be revisited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, the applicant expressly reserves the right to use all of or a portion of any originally filed claim, as the scope of such claims are set forth in this patent application, as additional description to support any of or all of the claims or any element or component thereof, and the applicant further expressly reserves the right to move any portion of or all of the content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content shall survive during the entire pendency of this application including any subsequent continuation, division, or continuation-in-part application thereof or any reissue or extension thereon.

What is claimed is:

1. A method of solar energy power conversion comprising the steps of:
    creating an MPP voltage DC photovoltaic output from at least one solar panel;
    establishing said MPP voltage DC photovoltaic output as an MPP voltage DC photovoltaic input to a photovoltaic DC-DC power converter;
    providing at least one external power converter voltage parameter to said photovoltaic DC-DC power converter;
    dynamically adjusting a maximum voltage set output limit of said photovoltaic DC-DC power converter in relation to said provided external power converter voltage parameter;
    compensating for an external power converter voltage via said step of dynamically adjusting a maximum voltage set output limit of said photovoltaic DC-DC power converter;
    slaving said step of dynamically adjusting a maximum voltage set output limit of said photovoltaic DC-DC power converter to a regulatory voltage limit;
    converting said MPP voltage DC photovoltaic input with said photovoltaic DC-DC power converter utilizing said dynamically adjusted maximum voltage set output limit into a converted DC photovoltaic output;
    establishing said converted DC photovoltaic output as a converted DC photovoltaic input to a DC-AC inverter;
    inverting said converted DC photovoltaic input into an inverted AC photovoltaic output.

2. A solar energy power conversion apparatus comprising:
    at least one solar panel having a DC photovoltaic output;
    maximum photovoltaic power point converter functionality control circuitry to which said at least one solar panel is responsive;
    a photovoltaic DC-DC power converter having a DC photovoltaic input that accepts power from said DC photovoltaic output;
    at least one external power converter voltage output data interface of said photovoltaic DC-DC power converter;
    a dynamically adjustable maximum voltage set output limit compensation control of said photovoltaic DC-DC power converter relationally responsive to said at least one external power converter voltage output data interface;
    a regulatory slaved primary control to which said dynamically adjustable maximum voltage set output limit compensation control of said photovoltaic DC-DC power converter is relationally responsive;
    at least one converted DC photovoltaic output of said photovoltaic DC-DC power converter;
    a photovoltaic DC-AC inverter input of a photovoltaic DC-AC inverter responsive to said converted DC photovoltaic output of said photovoltaic DC-DC power converter;
    a photovoltaic AC power output responsive to said photovoltaic DC-AC inverter.

3. A method of solar energy power conversion comprising the steps of:
    creating a DC photovoltaic output from at least one solar energy source;

establishing said DC photovoltaic output as a DC photovoltaic input to a photovoltaic DC-DC power converter;

providing at least one external state parameter to said photovoltaic DC-DC power converter;

relationally setting a dynamically adjustable maximum voltage set output limit of said photovoltaic DC-DC power converter in relation to said at least one external state parameter;

converting said DC photovoltaic input with said photovoltaic DC-DC power converter utilizing said dynamically adjustable maximum voltage set output limit into a converted DC photovoltaic output.

4. A method of solar energy power conversion as described in claim 3 wherein said solar energy source comprises a solar energy source selected from the group consisting of at least one solar cell, a plurality of electrically connected solar cells, a plurality of adjacent electrically connected solar cells, at least one solar panel, a plurality of electrically connected solar panels, and at least one string of electrically connected solar panels.

5. A method of solar energy power conversion as described in claim 3 wherein said step of creating a DC photovoltaic output from said at least one solar energy source comprises the step of creating MPP voltage for said at least one solar energy source.

6. A method of solar energy power conversion as described in claim 3 wherein said step of providing at least one external state parameter to said photovoltaic DC-DC power converter comprises the step of providing at least one external state parameter selected from the group consisting of a voltage parameter, a current parameter, a power parameter, an insolation parameter, a temperature parameter, a system status parameter, a demand status parameter, a power converter output parameter, a string output parameter, a historical data tracking parameter, and a regulatory requirement parameter.

7. A method of solar energy power conversion as described in claim 3 wherein said step of providing at least one external state parameter to said photovoltaic DC-DC power converter comprises the step of providing at least one multi-parametric external state parameter.

8. A method of solar energy power conversion as described in claim 7 wherein said step of providing at least one multi-parametric external state parameter comprises the step of including a parametric component for said at least one multi-parametric external state parameter selected from the group consisting of a voltage parameter, a current parameter, a power parameter, an insolation parameter, a temperature parameter, a system status parameter, a demand status parameter, a power converter output parameter, a string output parameter, a historical data tracking parameter, and a regulatory requirement parameter.

9. A method of solar energy power conversion as described in claim 3 wherein said step of relationally setting a dynamically adjustable maximum voltage set output limit comprises the step of dynamically adjusting said dynamically adjustable maximum voltage set output limit responsive to said at least one external state parameter.

10. A method of solar energy power conversion as described in claim 9 wherein said step of dynamically adjusting said dynamically adjustable maximum voltage set output limit comprises a step selected from the group consisting of operating said photovoltaic DC-DC power converter at a suboptimal efficiency, operating said photovoltaic DC-DC power converter at a suboptimal input voltage, operating said photovoltaic DC-DC power converter at a suboptimal power loss, and operating said at least one solar energy source at a suboptimal MPP voltage.

11. A method of solar energy power conversion as described in claim 9 wherein said step of dynamically adjusting said dynamically adjustable maximum voltage set output limit comprises the steps of:

implementing a step function to dynamically adjust said dynamically adjustable maximum voltage set output limit;

determining a resultant effect on said external state parameter;

repeating said steps of implementing and determining until a desired result is achieved.

12. A method of solar energy power conversion as described in claim 9 wherein said step of dynamically adjusting said dynamically adjustable maximum voltage set output limit comprises the step of first adjusting an external voltage to a safe condition.

13. A method of solar energy power conversion as described in claim 9 wherein said step of dynamically adjusting said dynamically adjustable maximum voltage set output limit comprises the step of compensating for said external state parameter.

14. A method of solar energy power conversion as described in claim 13 wherein said step of compensating for said external state parameter comprises the step of raising a voltage limit of said photovoltaic DC-DC power converter in response to a voltage drop of said external state parameter.

15. A method of solar energy power conversion as described in claim 13 wherein said step of compensating for said external state parameter comprises the step of lowering a voltage limit of said photovoltaic DC-DC power converter in response to a voltage gain of said external state parameter.

16. A method of solar energy power conversion as described in claim 3 wherein said step of relationally setting a dynamically adjustable maximum voltage set output limit comprises the step of slaving said dynamically adjustable maximum voltage set output limit of said photovoltaic DC-DC power converter in relation to said at least one external state parameter.

17. A method of solar energy power conversion as described in claim 16 wherein said step of slaving said dynamically adjustable maximum voltage set output limit comprises the step of hierarchically slaving said dynamically adjustable maximum voltage set output limit of said photovoltaic DC-DC power converter in relation to said at least one external state parameter.

18. A method of solar energy power conversion as described in claim 17 wherein said step of hierarchically slaving said dynamically adjustable maximum voltage set output limit comprises the steps of:

first slaving to a regulatory parameter;
second slaving to an operational parameter;
third slaving to an MPP parameter.

19. A method of solar energy power conversion as described in claim 3 wherein said step of providing at least one external state parameter comprises the step of providing at least one intra-string parameter, and wherein said step of relationally setting a dynamically adjustable maximum voltage set output limit comprises the step of dynamically adjusting said dynamically adjustable maximum voltage set output limit utilizing said at least one intra-string parameter to achieve a desired condition for a string.

20. A method of solar energy power conversion as described in claim 19 wherein said desired condition for a string comprises a condition selected from the group consisting of a desired voltage for said string, a nontraditionally high voltage for said string, a near regulatory limit voltage for said string, greater than 400 volts for said string, greater than 450 volts for said string, greater than 500 volts for said string, greater than 550 volts for said string, greater than 65% of a regulatory voltage requirement for said string, greater than 70% of a regulatory voltage requirement for said string, greater than 75% of a regulatory voltage requirement for said string, greater than 80% of a regulatory voltage requirement for said string, greater than 85% of a regulatory voltage requirement for said string, greater than 90% of a regulatory voltage requirement for said string, and greater than 95% of a regulatory voltage requirement for said string.

21. A method of solar energy power conversion as described in claim 19 wherein said step of providing at least one intra-string parameter comprises the step of providing a voltage for at least one intra-string element, and wherein said step of dynamically adjusting said dynamically adjustable maximum voltage set output limit comprises the step of compensating for said voltage for said at least one intra-string element.

22. A method of solar energy power conversion as described in claim 21 wherein said at least one intra-string element comprises at least one intra-string solar energy source connected to at least one intra-string photovoltaic DC-DC power converter serially located on said string.

23. A method of solar energy power conversion as described in claim 21 wherein said step of compensating for said voltage comprises the step of compensating selected from the group consisting of compensating for an increased voltage output of at least one intra-string solar energy source, compensating for a decreased voltage output of at least one intra-string solar energy source, compensating for dropout of at least one intra-string solar energy source, compensating for shading of at least one intra-string solar energy source, compensating for blockage of at least one intra-string solar energy source, compensating for damage to at least one intra-string solar energy source, compensating for malfunctioning of at least one intra-string solar energy source, and compensating for non-uniformity in at least one intra-string solar energy source.

24. A method of solar energy power conversion as described in claim 19 further comprising the step of dynamically adjusting a dynamically adjustable maximum voltage set output limit for a plurality of photovoltaic DC-DC power converters utilizing said at least one intra-string parameter to achieve a desired condition for said string.

25. A method of solar energy power conversion as described in claim 3 wherein said step of providing at least one external state parameter comprises the step of providing at least one inter-string parameter, and wherein said step of relationally setting a dynamically adjustable maximum voltage set output limit comprises the step of dynamically adjusting said dynamically adjustable maximum voltage set output limit utilizing said at least one inter-string parameter to achieve a desired inter-string condition.

26. A method of solar energy power conversion as described in claim 25 wherein said desired inter-string condition comprises a condition selected from the group consisting of a desired inter-string voltage, a nontraditionally high inter-string voltage, an inter-string voltage close to a regulatory limit, an inter-string voltage of greater than 400 volts, an inter-string voltage of greater than 450 volts, an inter-string voltage of greater than 500 volts, an inter-string voltage of greater than 550 volts, an inter-string voltage of greater than 65% of a regulatory voltage requirement, an inter-string voltage of greater than 70% of a regulatory voltage requirement, an inter-string voltage of greater than 75% of a regulatory voltage requirement, an inter-string voltage of greater than 80% of a regulatory voltage requirement, an inter-string voltage of greater than 85% of a regulatory voltage requirement, an inter-string voltage of greater than 90% of a regulatory voltage requirement, and an inter-string voltage of greater than 95% of a regulatory voltage requirement.

27. A method of solar energy power conversion as described in claim 25 wherein said step of providing at least one inter-string parameter comprises the step of providing a voltage for at least one external string, and wherein said step of dynamically adjusting said dynamically adjustable maximum voltage set output limit comprises the step of compensating for said voltage for said at least one external string.

28. A method of solar energy power conversion as described in claim 27 wherein said at least one external string comprises at least one parallel external string.

29. A method of solar energy power conversion as described in claim 27 wherein said step of compensating for said voltage comprises the step of compensating selected from the group consisting of compensating for an increased voltage output of at least one external string, compensating for a decreased voltage output of at least one external string, compensating for dropout of at least one external string, compensating for shading of at least one external string, compensating for blockage of at least one external string, compensating for damage to at least one external string, compensating for malfunctioning of at least one external string, and compensating for non-uniformity in at least one external string.

30. A method of solar energy power conversion as described in claim 25 further comprising a step selected from the group consisting of dynamically adjusting a dynamically adjustable maximum voltage set output limit for a plurality of photovoltaic DC-DC power converters utilizing said at least one inter-string parameter to achieve a desired inter-string condition, dynamically adjusting a dynamically adjustable maximum voltage set output limit for a plurality of photovoltaic DC-DC power converters on a single string utilizing said at least one inter-string parameter to achieve a desired inter-string condition, and dynamically adjusting a dynamically adjustable maximum voltage set output limit for a plurality of photovoltaic DC-DC power converters on a plurality of strings utilizing said at least one inter-string parameter to achieve a desired inter-string condition.

31. A method of solar energy power conversion as described in claim 3 further comprising the steps of:
  providing said at least one external state parameter to a plurality of photovoltaic DC-DC power converters;
  relationally setting a dynamically adjustable maximum voltage set output limit in multiple of said plurality of photovoltaic DC-DC power converters, each in relation to said provided at least one external state parameter.

32. A method of solar energy power conversion as described in claim 31 wherein said step of providing said at least one external state parameter to a plurality of photovoltaic DC-DC power converters comprises the step of providing a state parameter of at least one photovoltaic DC-DC power converter to at least another photovoltaic DC-DC power converter, and wherein said step of relationally setting a dynamically adjustable maximum voltage set output limit comprises the step of relationally setting a dynamically adjustable maximum voltage set output limit of the photovoltaic DC-DC power converter to which said state parameter was provided in relation to said provided state parameter.

33. A method of solar energy power conversion as described in claim 3 further comprising the steps of:
    establishing said converted DC photovoltaic output as a converted DC photovoltaic input to a DC-AC inverter;
    inverting said converted DC photovoltaic input into an inverted AC photovoltaic output.

34. A solar energy power conversion apparatus comprising:
    at least one solar energy source having a DC photovoltaic output;
    a photovoltaic DC-DC power converter having a DC photovoltaic input that accepts power from said DC photovoltaic output;
    at least one external state data interface of said photovoltaic DC-DC power converter;
    a dynamically adjustable maximum voltage set output limit control of said photovoltaic DC-DC power converter relationally responsive to said at least one external state data interface;
    at least one converted DC photovoltaic output of said photovoltaic DC-DC power converter.

\* \* \* \* \*